United States Patent
Nabeshima et al.

(10) Patent No.: US 12,108,144 B2
(45) Date of Patent: Oct. 1, 2024

(54) IMAGE PICKUP APPARATUS, ACCESSORY, CONTROL METHOD OF IMAGE PICKUP APPARATUS, CONTROL METHOD OF ACCESSORY, AND STORAGE MEDIUM

(71) Applicant: CANON KABUSHIKI KAISHA, Tokyo (JP)

(72) Inventors: Rui Nabeshima, Kanagawa (JP); Hiromichi Sakamoto, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 235 days.

(21) Appl. No.: 17/725,205

(22) Filed: Apr. 20, 2022

(65) Prior Publication Data

US 2022/0345615 A1 Oct. 27, 2022

(30) Foreign Application Priority Data

Apr. 23, 2021 (JP) ................................ 2021-072962

(51) Int. Cl.
*H04N 23/661* (2023.01)
(52) U.S. Cl.
CPC ................. *H04N 23/661* (2023.01)
(58) Field of Classification Search
CPC .... H04N 23/661; H04N 23/57; H04N 23/663; G03B 2206/00; G03B 2215/0514; G03B 17/56; G03B 31/00; G03B 15/05
See application file for complete search history.

(56) References Cited

U.S. PATENT DOCUMENTS

| 10,750,078 | B2* | 8/2020 | Seki | G03B 17/14 |
| 11,743,582 | B2* | 8/2023 | Tsuchiya | G03B 17/14 348/211.1 |
| 2007/0005845 | A1* | 1/2007 | Abe | G06F 3/123 710/62 |
| 2011/0170853 | A1* | 7/2011 | Osawa | G03B 7/20 396/529 |
| 2012/0155853 | A1* | 6/2012 | Osawa | G03B 17/14 396/529 |

(Continued)

FOREIGN PATENT DOCUMENTS

| GB | 2554163 A | 3/2018 |
| JP | 2020-012978 A | 1/2020 |
| JP | 2021-063866 A | 4/2021 |

OTHER PUBLICATIONS

The above patent documents were cited in a European Search Report issued on Sep. 21, 2022, which is enclosed, that issued in the corresponding European Patent Application No. 22169167.8.

(Continued)

*Primary Examiner* — Chiawei Chen
(74) *Attorney, Agent, or Firm* — Cowan, Liebowitz & Latman, P.C.

(57) ABSTRACT

An image pickup apparatus includes a first control unit communicable with the accessory by a first communication method, and a second control unit communicable with the accessory by a second communication method. The first control unit acquires control information on the second communication method from the accessory. The second control unit determines a control method for communication with the accessory based on the control information acquired by the first control unit.

14 Claims, 19 Drawing Sheets

(56) References Cited

U.S. PATENT DOCUMENTS

| | | | |
|---|---|---|---|
| 2015/0069244 A1* | 3/2015 | Ko ...................... | H04N 25/134 |
| | | | 250/338.4 |
| 2018/0275494 A1* | 9/2018 | Watanabe ............ | H04N 23/663 |
| 2020/0029015 A1* | 1/2020 | Kawai .................. | H04N 23/665 |

OTHER PUBLICATIONS

The above patent document was cited in a European Search Report issued on Aug. 16, 2024, a copy of which is enclosed, that issued in the corresponding European Patent Application No. 22169167.8.

* cited by examiner

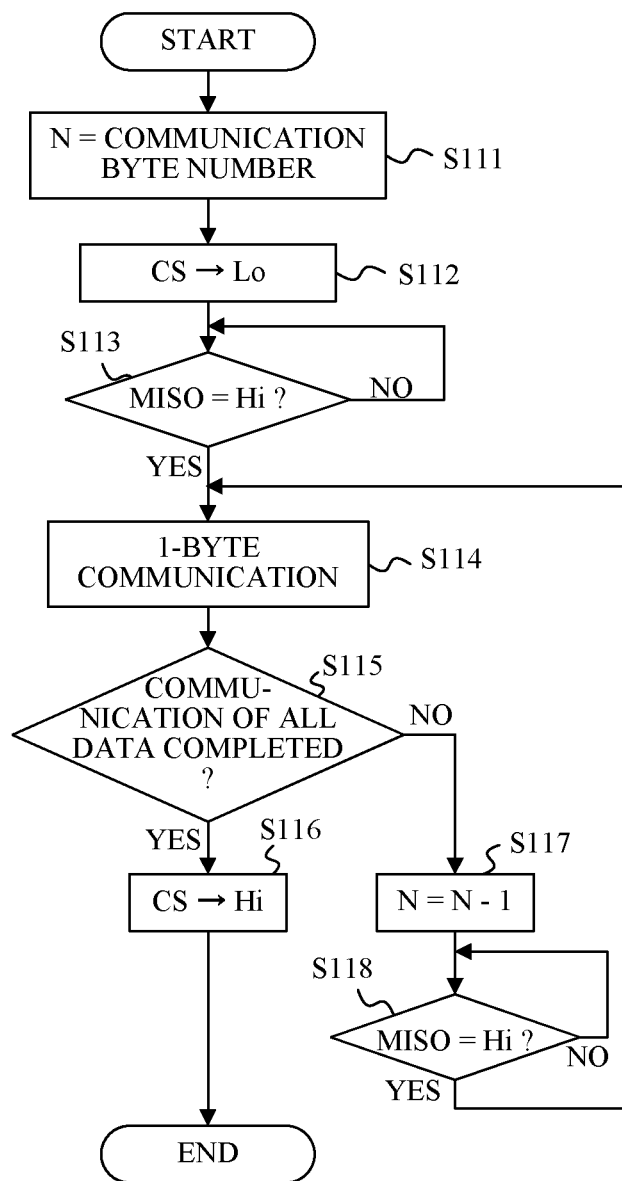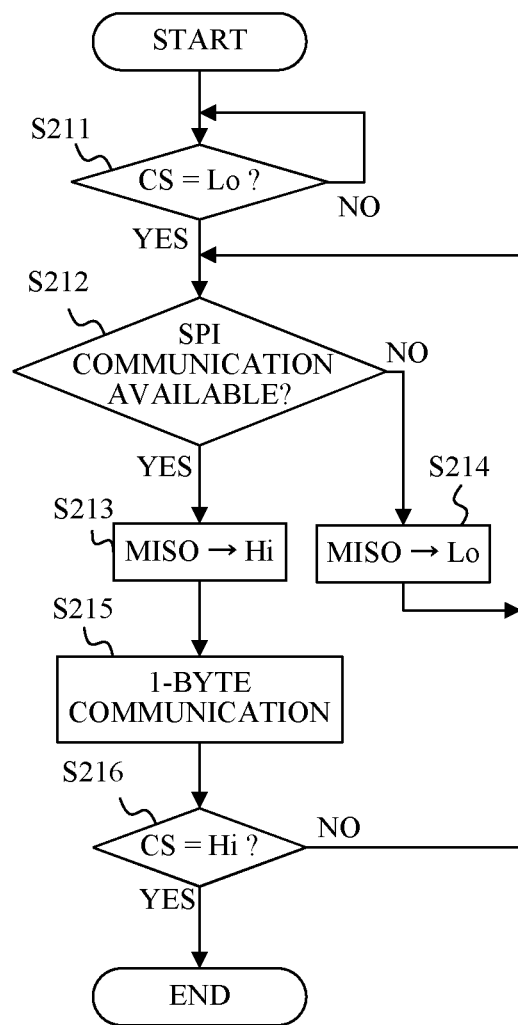
FIG. 2E
FIG. 2F

| | 1ST BYTE | 2ND BYTE | 3RD BYTE | ... | (N-2)TH BYTE | (N-1)TH BYTE | NTH BYTE |
|---|---|---|---|---|---|---|---|
| MOSI DATA | CMD | MOSI_DATA1 | MOSI_DATA2 | ... | MOSI_DATA[N-3] | CheckSum_C | 0x00 |
| MISO DATA | 0xA5 | CMD | MISO_DATA1 | ... | MISO_DATA[N-4] | 0x00 | CheckSum_A |

FIG. 3

| ADDRESS | D7 | D6 | D5 | D4 | D3 | D2 | D1 | D0 |
|---|---|---|---|---|---|---|---|---|
| 0x00 | ACC TYPE ||||||||
| 0x01 | ACC ID NO. ||||||||
| 0x02 | FIRMWARE VER. ||||||||
| 0x03 | POWER SUPPLY DURING POWER-OFF ||| POWER SUPPLY DURING AUTOMATIC POWER-OFF | POWER SUPPLY SPECIFICATION || CHARGEABILITY ||
| 0x04 | REQUEST POWER ||||||||
| 0x05 | FIRMWARE UPDATE MODE | FIRMWARE UPDATE FUNCTION | INTERMEDIATE ACCESSORY OPERATION PERMISSION | INTERMEDIATE ACCESSORY CONFIRMATION AT START || I2C COMMAND COMMUNICATION AVAILABILITY ||
| 0x06 | RESERVE || COMMUNICATION REQUEST FACTOR ACQUIRING METHOD | FUNCTIONAL SIGNAL 4 | FUNCTIONAL SIGNAL 3 | FUNCTIONAL SIGNAL 2 | FUNCTIONAL SIGNAL 1 ||
| 0x07 | RESERVE ||||||||
| 0x08 | RESERVE ||||||||
| 0x09 | RESERVE ||||||||
| 0x0A | SILENT START | COMMUNICATION REQUEST FACTOR |||||||
| 0x0B | RESERVE ||||||||
| 0x0C | RESERVE |||||| SPI PROTOCOL | CS LOGIC |
| 0x0D | COMMUNICATION INTERVAL BETWEEN SPI BYTES ||||||||
| 0x0E | COMMUNICATION INTERVAL BETWEEN SPI BYTES (IN FIRMWARE UPDATE MODE) ||||||||
| 0x0F | CHECKSUM ||||||||

FIG. 4

| NO. | TYPE |
|---|---|
| 0x00 | RESERVE |
| 0x01 | RESERVE |
| : | : |
| 0x80 | RESERVE |
| 0x81 | STROBE |
| 0x82 | INTERFACE CONVERSION ADAPTER |
| 0x83 | MICROPHONE |
| 0x84 | MULTI-ACCESSORY CONNECTION ADAPTER |
| 0x85 | RESERVE |
| 0x86 | RESERVE |
| 0x87 | RESERVE |
| 0x88 | RESERVE |
| 0x89 | RESERVE |
| 0x90 | RESERVE |
| : | : |
| 0xFF | RESERVE |

FIG. 6

| FACTOR NO. | FACTOR CONTENT |
|---|---|
| 0x00 | PRESS OF MENU CALL SW |
| 0x01 | VOICE STABILIZATION COMPLETION |
| 0x02 | VOICE UNMUTE |
| 0x03 | |
| 0x04 | |
| 0x05 | |
| 0x06 | |
| 0x07 | |
| : | |
| 0x79 | |
| 0x7A | |
| 0x7B | |
| 0x7C | |
| 0x7D | |
| 0x7E | |
| 0x7F | |

FIG. 7

| | COMMUNICATION INTERVAL |
|---|---|
| 0 | 1us |
| 1 | 2us |
| 2 | 5us |
| 3 | 10us |
| 4 | 15us |
| 5 | 25us |
| 6 | 50us |
| 7 | 100us |

FIG. 8A

| | COMMUNICATION INTERVAL |
|---|---|
| 0 | 1ms |
| 1 | 2ms |
| 2 | 5ms |
| 3 | 10ms |
| 4 | 20ms |
| 5 | 50ms |
| 6 | 80ms |
| 7 | 100ms |

FIG. 8B

IMAGE PICKUP APPARATUS, ACCESSORY, CONTROL METHOD OF IMAGE PICKUP APPARATUS, CONTROL METHOD OF ACCESSORY, AND STORAGE MEDIUM

BACKGROUND OF THE INVENTION

Field of the Invention

The present invention relates to an image pickup apparatus and an accessory.

Description of the Related Art

There has conventionally known an accessory such as a strobe device and a microphone device that is attachable to and detachable from an image pickup apparatus. The accessory performs a variety of types of control processing in response to a command from the image pickup apparatus. In order to properly control the accessory based on the command from the image pickup apparatus, communication control suitable for each accessory is necessary such as a type and function of the accessory.

Japanese Patent Laid-Open No. 2020-12978 discloses a camera system that notifies a camera of generation information on a communication specification supported by an accessory, notifies the accessory of generation information on a communication specification supported by the camera, and determines a communication control method.

Performing communication control more suitable for each accessory such as the type and function of the accessory is demanded.

SUMMARY OF THE INVENTION

The present invention provides an image pickup apparatus, an accessory, a control method for the image pickup apparatus, a control method for the accessory, and a storage medium, each of which can perform communication control suitable for each accessory.

An image pickup apparatus according to one aspect of the present invention is attachable to and detachable from an accessory. The image pickup apparatus includes at least one processor, and at least one memory coupled to the at least one processor storing instructions that, when executed by the at least one processor, cause the at least one processor to function as a first control unit communicable with the accessory by a first communication method, and a second control unit communicable with the accessory by a second communication method. The first control unit acquires control information on the second communication method from the accessory. The second control unit determines a control method for communication with the accessory based on the control information acquired by the first control unit. A control method corresponding to the above image pickup apparatus, and a storage medium storing a program that causes a computer of the image pickup apparatus to execute the above control method also constitute another aspect of the present invention.

An accessory according to one aspect of the present invention is attachable to and detachable from an image pickup apparatus. The accessory includes at least one processor, and at least one memory coupled to the at least one processor storing instructions that, when executed by the at least one processor, cause the at least one processor to function as a control unit communicable with the image pickup apparatus by a first communication method and a second communication method. The control unit transmits control information on the second communication method to the image pickup apparatus in the first communication method, and communicates with the image pickup apparatus by the second communication method according to a control method that has been determined by the image pickup apparatus based on the control information. A control method corresponding to the above image pickup apparatus, and a storage medium storing a program that causes a computer of the image pickup apparatus to execute the above control method also constitute another aspect of the present invention.

Further features of the present invention will become apparent from the following description of exemplary embodiments with reference to the attached drawings.

BRIEF DESCRIPTION OF THE DRAWINGS

FIG. 2E is a flowchart showing an operation of the camera control circuit B in the SPI protocol B in this embodiment.

FIG. 2F is a flowchart showing an operation of the accessory control circuit in the SPI protocol B in this embodiment.

FIG. 3 is an explanatory diagram of SPI communication contents in this embodiment.

FIG. 4 is an explanatory diagram of accessory information in this embodiment.

FIG. 6 is an explanatory diagram of accessory type information in this embodiment.

FIG. 7 is an explanatory diagram of a factor number and a factor content of a communication request in this embodiment.

FIGS. 8A and 8B are explanatory diagrams of communication data interval information in SPI communication in this embodiment.

DESCRIPTION OF THE EMBODIMENTS

Referring now to the accompanying drawings, a detailed description will be given of embodiments according to the present invention.

Figure 1:
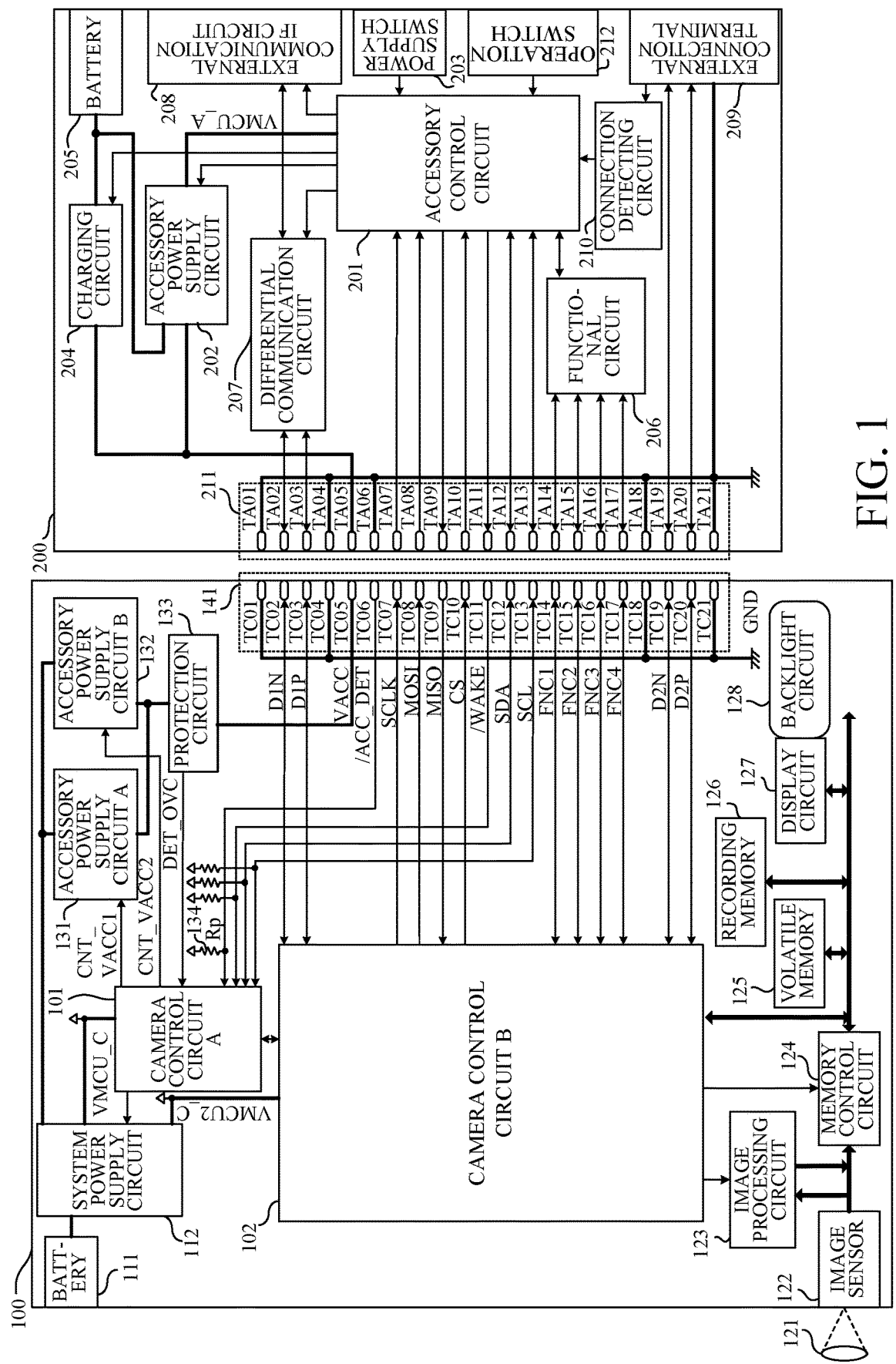
FIG. 1 is a configuration diagram of a camera system according to this embodiment.

Referring now to FIG. 1, a description will be given of a camera system (image pickup system) 10 according to this embodiment. FIG. 1 is a configuration diagram of the camera system 10. The camera system 10 includes a camera (image pickup apparatus) 100 as an electronic apparatus and an accessory 200 detachably attached to the camera 100. The camera 100 and the accessory 200 are electrically connected via one-to-one contacts between a plurality of contacts (terminals) TC01 to TC21 of a camera connector 141 of the camera 100 and a plurality of contacts TA01 to TA21 of an accessory connector 211 of the accessory 200, respectively.

The camera 100 is supplied with power from a battery 111. The battery 111 is attachable to and detachable from the camera 100. A camera control circuit A 101 (first control unit) and a camera control circuit B 102 (second control unit) as control units of the camera 100 are circuits that control the entire camera 100, and include a processor (microcomputer) that includes a CPU etc. The camera control circuit A101 monitors a switch or the like for unillustrated camera operations. The camera control circuit A101 operates even when the camera 100 is in the standby state (low power consumption mode), and controls a system power supply and the like in accordance with an operation of the user. The camera control circuit B 102 is responsible for controlling an image sensor 122, a display circuit 127, and the like, and the camera 100 is stopped when the camera 100 is in the standby state (low power consumption mode).

A system power supply circuit 112 is a circuit that generates power to be supplied to each circuit in the camera 100, and includes a DC/DC converter circuit, Low Drop Out (LDO), a charge pump circuit, and the like. A voltage of 1.8 V that is generated by the system power supply circuit 112 that receives power from the battery 111 is constantly supplied as camera microcomputer power supply VMCU_C to the camera control circuit A 101. Several types of voltages that are generated by the system power supply circuit 112 are supplied as camera microcomputer power supply VMCU2_C to the camera control circuit B 102 at an arbitrary timing. The camera control circuit A 101 controls turning on and off of the power supply to each circuit in the camera 100 by controlling the system power supply circuit 112.

An optical lens (lens apparatus) 121 is attachable to and detachable from the camera 100. Light from an object incident through the optical lens 121 is imaged on the image sensor 122, such as a CMOS sensor and a CCD sensor. The optical lens 121 and the camera 100 may be integrated. An object image formed on the image sensor 122 is encoded into a digital imaging signal. An image processing circuit 123 performs image processing such as noise reduction processing and white balance processing for the digital imaging signal to generate image data, and converts the image data into an image file in a JPEG format or the like in order to record the image data in a recording memory 126. The image processing circuit 123 generates from the image data VRAM image data to be displayed on the display circuit 127. A conversion into another voltage may be used.

A memory control circuit 124 controls transmissions and receptions of image data and other data generated by the image processing circuit 123 and the like. A volatile memory 125 is a memory capable of high-speed reading and writing such as DDR3SDRAM, and is used as a workspace for image processing that is performed by the image processing circuit 123. The recording memory 126 is a readable and writable recording medium such as an SD card or a CFexpress card that is attachable to and detachable from the camera 100 via an unillustrated connector. The display circuit 127 is a display disposed on a back surface of the camera 100, and includes an LCD panel, an organic EL display panel, and the like. A backlight circuit 128 adjusts the brightness of the display circuit 127 by changing the light amount of the backlight of the display circuit 127.

Each of a power supply circuit A for the accessory (accessory power supply circuit A hereinafter) 131 and a power supply circuit B for the accessory (accessory power supply circuit B hereinafter) 132 is a voltage conversion circuit that converts voltage supplied from the system power supply circuit 112 into predetermined voltage and generates 3.3 V as accessory power supply VACC in this embodiment. The accessory power supply circuit A 131 is a power supply circuit that includes LD0 or the like and has a low self-power consumption. The accessory power supply circuit B 132 includes a DC/DC converter circuit or the like, and can pass current larger than that of the accessory power supply circuit A 131. The self-power consumption of the accessory power supply circuit B 132 is larger than that of the accessory power supply circuit A 131. Therefore, when a load current is small, the accessory power supply circuit A 131 is more efficient than the accessory power supply circuit B 132, and when the load current is large, the accessory power supply circuit B 132 is more efficient than the accessory power supply circuit A 131. The camera control circuit A 101 controls turning on and off of voltage outputs of the accessory power supply circuits A 131 and B 132 according to the operating state of the accessory 200.

A protection circuit 133 as a projection unit includes a current fuse element, an electronic fuse circuit in which a poly-switch element or a resistor, an amplifier, and a switching element are combined, or the like. The protection circuit 133 outputs overcurrent detecting signal DET_OVC when power supply current values supplied to the accessory 200 from the accessory power supply circuits A 131 and B 132 are higher than a predetermined value and become excessive (abnormal). In this embodiment, the protection circuit 133 is the electronic fuse circuit, and notifies the camera control circuit A101 of the overcurrent detecting signal DET_OVC when a current of 1 A or more flows. The overcurrent detecting signal DET_OVC indicates the overcurrent by becoming at a high level. The predetermined value may be different from 1 A.

The camera connector 141 is a connector for an electrical connection with the accessory 200 via 21 contacts TC01 to TC21 that are arranged in a row. The contacts TC01 to TC21 are arranged in this order from one end to the other end in this arrangement direction.

The contact TC01 is connected to the ground (GND) and serves not only as a reference potential contact but also as a contact for controlling wiring impedances of the differential signals D1N and D1P. The contact TC01 corresponds to a third ground contact. The differential signal D1N that is connected to the contact TC02 and the differential signal D1P that is connected to the contact TC03 are differential data communication signals that perform data communications in pairs, and are connected to the camera control circuit B 102. The contacts TC02, TC03, TC07 to TC17 described below, TC19 and TC20 are communication contacts.

The contact TC04 as a first ground contact is connected to GND and serves as a reference potential contact for the camera 100 and the accessory 200. The contact TC04 is disposed outside the contact TC05 described below in the contact arrangement direction. The accessory power supply VACC generated by the accessory power supply circuits A 131 and B 132 is connected to the contact TC05 as a power supply contact via the protection circuit 133.

An accessory attachment detecting signal/ACC_DET is connected to the contact TC06 as an attachment detecting contact. The accessory attachment detecting signal/ACC_DET is pulled up to the camera microcomputer power supply VMCU_C via a resistor element Rp 134 (10 kΩ). The camera control circuit A 101 can detect whether or not the accessory 200 is attached by reading a signal level of the accessory attachment detecting signal/ACC_DET. If the signal level (potential) of the accessory attachment detecting signal/ACC_DET is high (predetermined potential), it is detected that the accessory 200 is not attached, and if it is a low level (GND potential as described below), it is detected that the accessory 200 is attached.

Changing the signal level (potential) of the accessory attachment detecting signal/ACC_DET from the high level (Hi) to the low level (Lo) when the camera 100 is powered on triggers various transmissions between the camera 100 and the accessory 200 via contacts.

The camera control circuit 101 supplies power to the accessory 200 via TC05 as the power supply contact in response to detecting the attachment of the accessory 200.

SCLK connected to the communication contact TC07, MOSI connected to a contact TC08, MISO connected to the contact TC09, and Chip Select (CS) connected to the contact TC10 are signals for Serial Peripheral Interface (SPI) communication in which the camera control circuit B 102 becomes a communication master. In this embodiment, the SPI communication has a communication clock frequency of 1 MHz, a data length of 8 bits (1 byte), and a bit order of MSB first, and a full-duplex communication method.

Figure 2A:
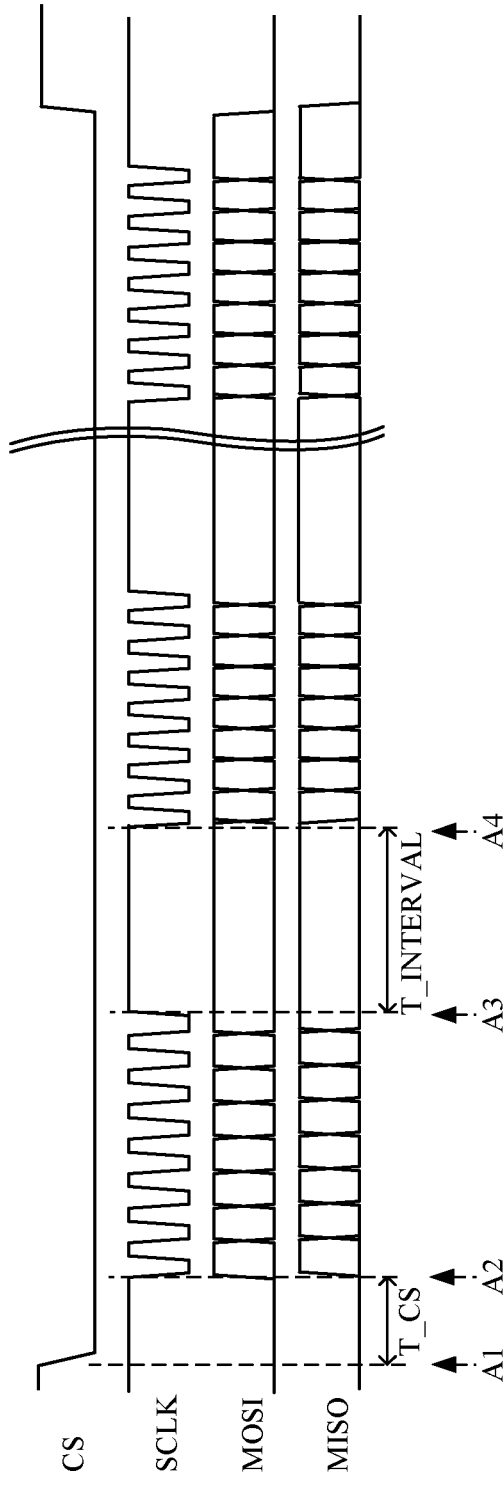
FIG. 2A is a schematic diagram of a communication waveform of SPI protocol A in this embodiment.

In this embodiment, the camera 100 and the accessory 200 can support two types of communication protocols (control methods) for the SPI communication method. The first communication protocol (first control method) is a method that does not confirm whether the accessory 200 is in a communicable state (communicability state of the accessory 200 or whether or not the accessory 200 is communicable) before the camera 100 outputs SCLK, and will be referred to as SPI protocol A in this embodiment. FIG. 2A is a schematic diagram of a communication waveform of the SPI protocol A. In FIG. 2A, a CS signal is low-active.

The camera control circuit B 102 changes CS into a low level at timing A1 and requests the accessory control circuit (control unit) 201 for the SPI communication. At timing A2 predetermined time T_CS after the timing A1, the camera control circuit B 102 starts outputting SCLK and MOSI. Similarly, when the accessory control circuit 201 detects a trailing edge of SCLK, the accessory control circuit 201 starts outputting MISO. The camera control circuit B 102 stops outputting SCLK at timing A3 when completing outputting 1-byte SCLK. The camera control circuit B 102 stops outputting SCLK at the timing A3 for predetermined time T_INTERVAL, resumes the output of SCLK at timing A4 after the T_INTERVAL has elapsed, and performs the next 1-byte communication.

Figure 2B:
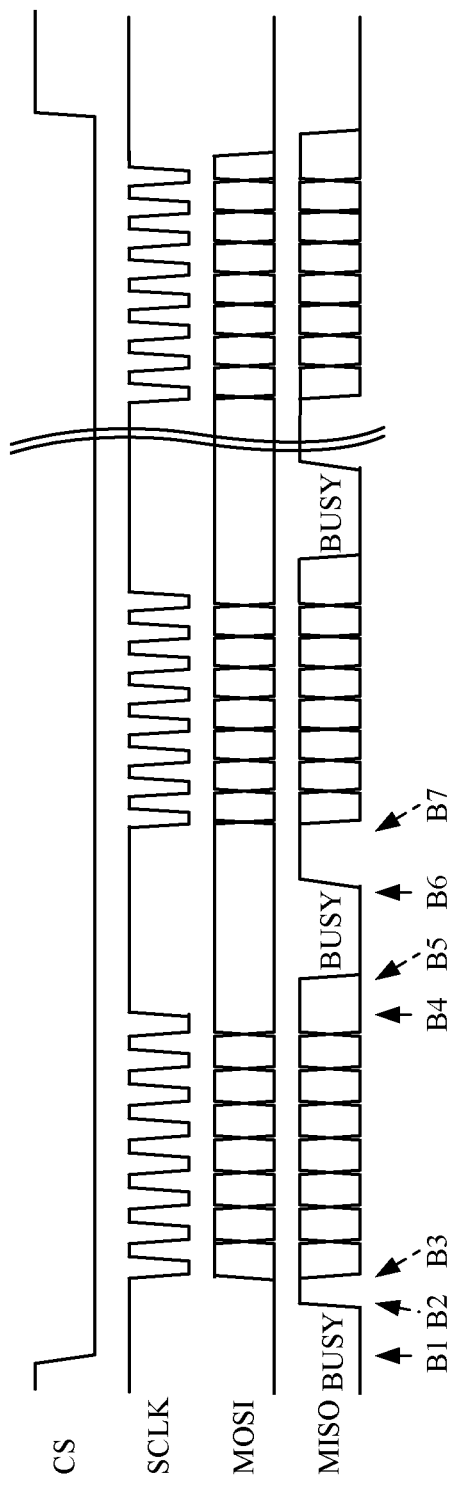
FIG. 2B is a schematic diagram of a communication waveform of SPI protocol B in this embodiment.
Figure 2C:
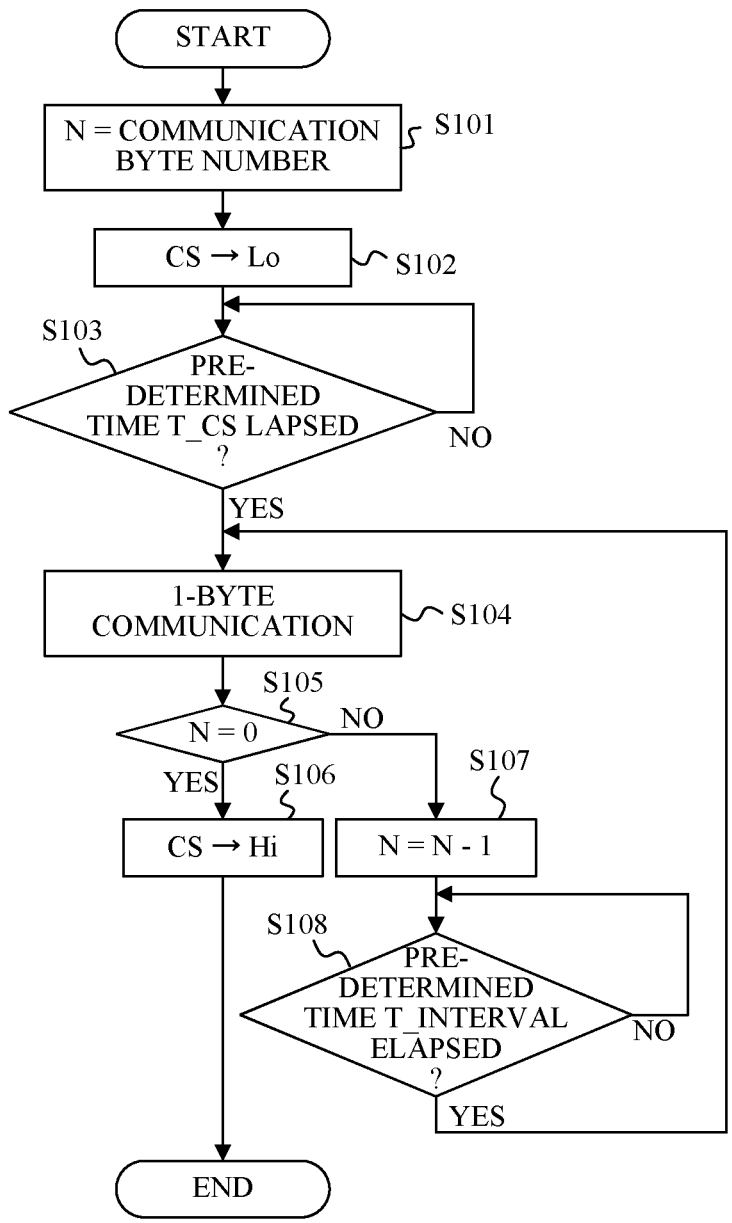
FIG. 2C is a flowchart showing an operation of a camera control circuit B in the SPI protocol A in this embodiment.

FIG. 2C is a flowchart showing an operation of the camera control circuit B102 in the SPI protocol A. In the step S101, the camera control circuit B 102 stores a numerical value indicating the number of bytes to be communicated in internal variable N. For example, 3 is stored in a case of 3-byte communication. Next, in the step S102, the camera control circuit B 102 changes CS to a low level and requests for SPI communication. In the step S103, the camera control circuit B 102 performs wait processing until predetermined time T_CS elapses after CS is changed to the low level. After the predetermined time T_CS elapses, the flow proceeds to the step S104.

In the step S104, the camera control circuit B 102 controls an SCLK output, a MOSI data output, and a MISO data input and performs 1-byte data communication. Next, in the step S105, the camera control circuit B102 determines whether the internal variable N indicating the number of communication bytes is 0. In the case where the internal variable N is 0, the flow proceeds to the step S106. On the other hand, in the case where the internal variable N is other than 0, the flow proceeds to the step S107.

In the step S107, the camera control circuit B 102 stores as new internal variable N a value obtained by decrementing the numerical value of the internal variable N indicating the number of communication bytes by 1. Next, in the step S108, the camera control circuit B 102 performs wait processing until the predetermined time T_INTERVAL elapses after the 1-byte data communication in the step S104 is completed. Then, after the predetermined time T_INTERVAL elapses, the flow returns to the processing in the step S104, and the camera control circuit B 102 executes the same processing again. In the step S106, the camera control circuit B 102 changes CS to a high level and ends a series of SPI communication.

Figure 2D:
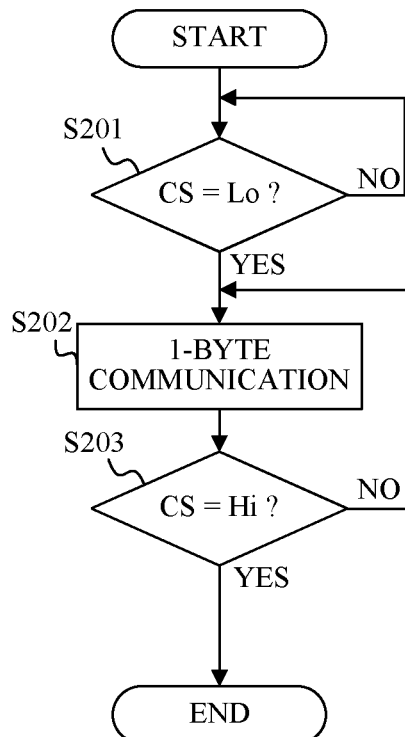
FIG. 2D is a flowchart showing an operation of an accessory control circuit in the SPI protocol A in this embodiment.

FIG. 2D illustrates an operation of the accessory control circuit 201 in the SPI protocol A. In the step S201, the accessory control circuit 201 determines whether or not CS has changed to a low level. In the case where CS has changed to the low level, the flow proceeds to the step S202, and in the case where CS has not changed to the low level, the flow returns to the step S211.

In the step S202, the accessory control circuit 201 performs the 1-byte data communication by the MOSI data input control and MISO data output control in response to the SCLK signal input. Next, in the step S203, the accessory control circuit 201 determines whether or not CS has changed to a high level. In the case where the CS has changed to the high level, the accessory control circuit 201 determines that the SPI communication has been completed. In the case where the CS has not changed to the high level, the flow returns to the step S202 so that the accessory control circuit 201 performs the next 1-byte communication.

The second communication protocol (second control method) is a method of confirming whether the accessory 200 is in a communicable state (communicability state of the accessory 200) before the camera 100 outputs SCLK and will be referred to as SPI protocol B in this embodiment. FIG. 2B is a schematic diagram of a communication waveform of the SPI protocol B. At timing B1, the camera control circuit B102 changes CS to a low level and requests the accessory control circuit 201 for SPI communication. The camera control circuit B102 confirms the potential of MISO together with the communication request. When the potential of MISO is a high level, the camera control circuit B102 determines that the accessory control circuit 201 is in a communicable state. On the other hand, when the potential of MISO is a low level, the camera control circuit B102 determines that the accessory control circuit 201 is in an incommunicable state.

On the other hand, when the accessory control circuit 201 detects a trailing edge of CS, the accessory control circuit 201 performs control for changing MISO to a high level if the SPI communication is available, and performs control for changing MISO to a low level if the communication is unavailable (B2).

When the camera control circuit B 102 confirms that MISO is at a high level at timing B3, the camera control circuit B 102 starts outputting SCLK and MOSI. The accessory control circuit 201 starts outputting MISO when detecting a trailing edge of SCLK. The camera control circuit B 102 stops outputting SCLK when the 1-byte SCLK output is completed at timing B4.

After the 1-byte communication, the accessory control circuit 201 performs control for changing MISO to a high level if the SPI communication is available, and control for changing MISO to a low level if the SPI communication is unavailable (B5, B6). The camera control circuit B 102 confirms the potential of MISO at timing B7. If MISO is at a high level, it is determined that the accessory control circuit 201 is in a communicable state, and if MISO is at a low level, it is determined that the accessory control circuit 201 is in an incommunicable state.

FIG. 2E is a flowchart illustrating processing of the camera control circuit B 102 in the SPI protocol B. In the step S111, the camera control circuit B 102 stores a numerical value indicating the number of bytes to be communicated in the internal variable N. For example, 3 is stored in the case of 3-byte communication. Next, in the step S112, the camera control circuit B 102 changes CS to a low level and requests SPI communication. Next, in the step S113, the camera control circuit B 102 determines whether MISO has changed to a high level. In the case where MISO is at the high level, the flow proceeds to the step S114, and in the case where MISO has not yet at the high level, the flow returns to the step S113.

In the step S114, the camera control circuit B 102 controls an SCLK output, a MOSI data output, and a MISO data input so as to perform 1-byte data communication. Next, in the step S115, the camera control circuit B 102 determines whether or not the internal variable N indicating the number of communication bytes is 0. In the case where the internal variable N is 0, the flow proceeds to the step S116, and in the case where the internal variable N is other than 0, the flow proceeds to the step S117.

In the step S117, the camera control circuit B 102 stores as new internal variable N a value obtained by decrementing the numerical value of the internal variable N indicating the number of communication bytes by 1. Next, in the step S118, the camera control circuit B 102 determines whether or not MISO has changed to a high level. In the case where MISO is at the high level, the flow proceeds to the step S114, and in the case where MISO has not yet been at the high level, the flow returns to the step S118. In the step S116, the camera control circuit B 102 changes CS to a high level and ends a series of SPI communications.

FIG. 2F is a flowchart illustrating an operation of the accessory control circuit 201 in the SPI protocol B. In the step S211, the accessory control circuit 201 determines whether or not CS has changed to a low level. In the case where CS has changed to the low level, the flow proceeds to the step S212, and in the case where CS has not yet changed to the low level, the flow returns to the step S211.

In the step S212, the accessory control circuit 201 determines whether or not the SPI communication is available. In the case where the SPI communication is available, the flow proceeds to the step S213, and in the case where the SPI communication is unavailable, the flow proceeds to the step S214. In the step S213, the accessory control circuit 201 performs control for changing MISO to a high level and the flow proceeds to the step S215. In the step S214, the accessory control circuit 201 performs control for changing MISO to a low level and the flow returns to the step S212.

In the step S215, the accessory control circuit 201 controls a MOSI data input and a MISO data output in response to the SCLK signal input and performs 1-byte data communication. Next, in the step S216, the accessory control circuit 201 determines whether or not CS has changed to a high level. In the case where CS has changed to the high level, it is determined that the SPI communication has been completed, and in the case where CS has not changed to the high level, the flow returns to the step S212 so as to perform the next 1-byte communication.

FIG. 3 explains communication contents in notifying an operation execution instruction (command) from the camera 100 to the accessory 200 by the SPI communication in this embodiment. The camera control circuit B 102 transmits as MOSI data information CMD indicating a command number to the accessory control circuit 201 in the first-byte communication. The accessory control circuit 201 transmits as MISO data a value of 0xA5, which is information indicating the communicable state. In the case where the first-byte communication processing cannot be executed, the accessory control circuit 201 transmits as MISO data a value other than 0xA5.

The camera control circuit B 102 transmits argument MOSI_DATA1 corresponding to the command number CMD in the second-byte communication. From the third byte to the (N−2)th byte, the camera control circuit B 102 similarly transmits the arguments MOSI_DATA2 to MOSI_DATA [N−3] corresponding to the command number CMD.

The accessory control circuit 201 transmits as MISO data the command number CMD received in the first byte to the camera control circuit B 102 in the second-byte communication. This configuration enables the camera control circuit B 102 to determine that the accessory control circuit 201 has correctly received the MOSI data.

The accessory control circuit 201 transmits, as MISO data, return value MISO_DATA1 corresponding to the command number CMD in the third-byte communication. From the fourth byte to the (N−2)th byte, the accessory control circuit 201 similarly transmits arguments MISO_DATA2 to MISO_DATA [N−4] corresponding to the command number CMD. Assume that the number of arguments and the number of return values are previously determined for each command number. One or both of the argument and the return value may be omitted.

The camera control circuit B 102 transmits checksum data CheckSum_C as MOSI data to the accessory control circuit 201 in the (N−1)th byte communication. The checksum data CheckSum_C is a value calculated by the following expression (1).

$$\text{CheckSum\_}C = \text{EXOR}(\text{AND}(\text{SUM}(CMD, \text{MOSI\_DATA1}, \ldots, \text{MOSI\_DATA}[N-3]), 0xFF), 0xFF) \quad (1)$$

The accessory control circuit 201 transmits 0x00 as MISO data.

The camera control circuit B 102 transmits 0x00 as MOSI data in the Nth-byte communication. The accessory control circuit 201 transmits checksum data CheckSum_A as MISO data. The checksum data CheckSum_A is calculated by the following expression (2) or (3).

In the case where the value of CheckSum_C received by the camera control circuit B 102 in the (N−1)th-byte communication and the value of CheckSum_C calculated by the camera control circuit B 102 accord with each other, CheckSum_A is calculated by the expression (2).

$$\text{CheckSum\_}A = \text{EXOR}(\text{AND}(\text{SUM}(0xA5, CMD, MIS0\_DATA1, \ldots, MOSI\_DATA[N-41]), 0xFF), 0xFF) \quad (2)$$

In the case where the value of CheckSum_C received by the camera control circuit B 102 in the (N−1)th-byte communication and the value of CheckSum_C calculated by the camera control circuit B 102 do not accord with each other, CheckSum_A is calculated by the expression (3).

$$\text{CheckSumA} = \text{AND}(\text{SUM}(0xA5, CMD, MISO\_DATA1, \ldots, MOSI\_DATA[N-41]), 0xFF) \quad (3)$$

The contact TC11 is connected with a communication request signal /WAKE for requesting communication from the accessory 200 to the camera control circuit A 101. The communication request signal /WAKE is pulled up to the camera microcomputer power supply VMCU_C via a resistor. The camera control circuit A 101 can receive a communication request from the accessory 200 by detecting a trailing edge in the communication request signal /WAKE.

SDA connected to the contact TC12 and SCL connected to the contact TC13 are signals for performing Inter-Integrated Circuit (I2C) communication in which the camera control circuit A 101 is a communication master. SDA and SCL are open-drain communications pulled up by the camera microcomputer power supply VMCU_C, and have communication frequencies of 100 kbps in this embodiment. In the I2C communication, both data transmission from the camera 100 and data transmission from the accessory 200 are performed via SDA. The communication speed of the I2C communication is lower than that of the SPI communication. The SPI communication has a communication speed higher than that of the I2C communication, and therefore is suitable for information communication having a large amount of data. Thus, in the communication between the camera 100 and the accessory 200 in this embodiment, information having a large amount of data is communicated by using the SPI communication, and information having a small amount of data is communicated by using the I2C communication. For example, data is first communicated by using the I2C communication, and when the SPI communication is available or needs to be executed based on this data, control can be made to further execute the SPI communication.

Figure 13A:
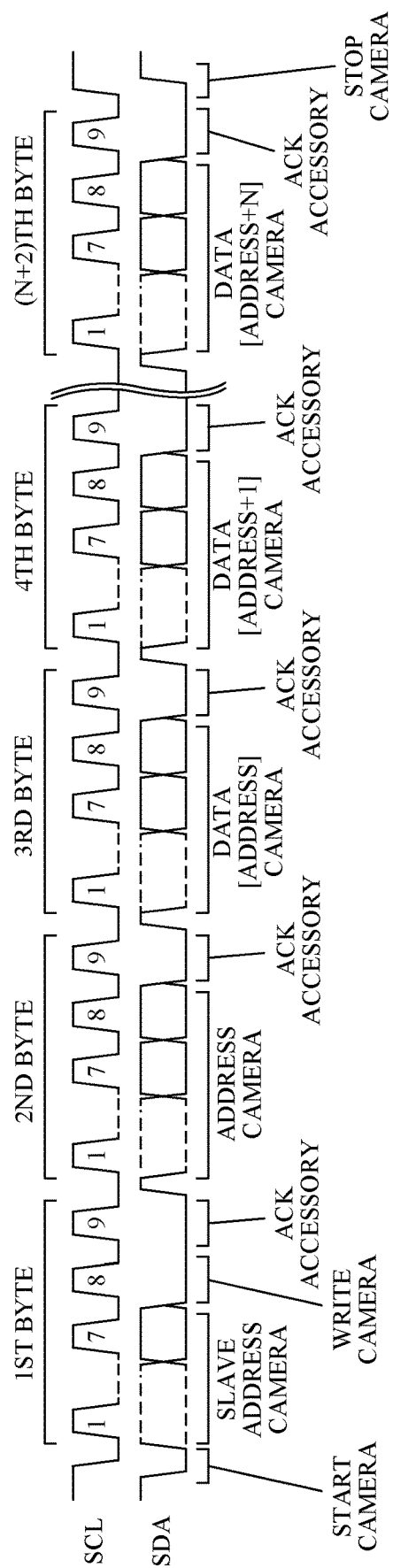
FIGS. 13A and 13B illustrate an example of an I2C communication waveform in this embodiment.
Figure 13B:
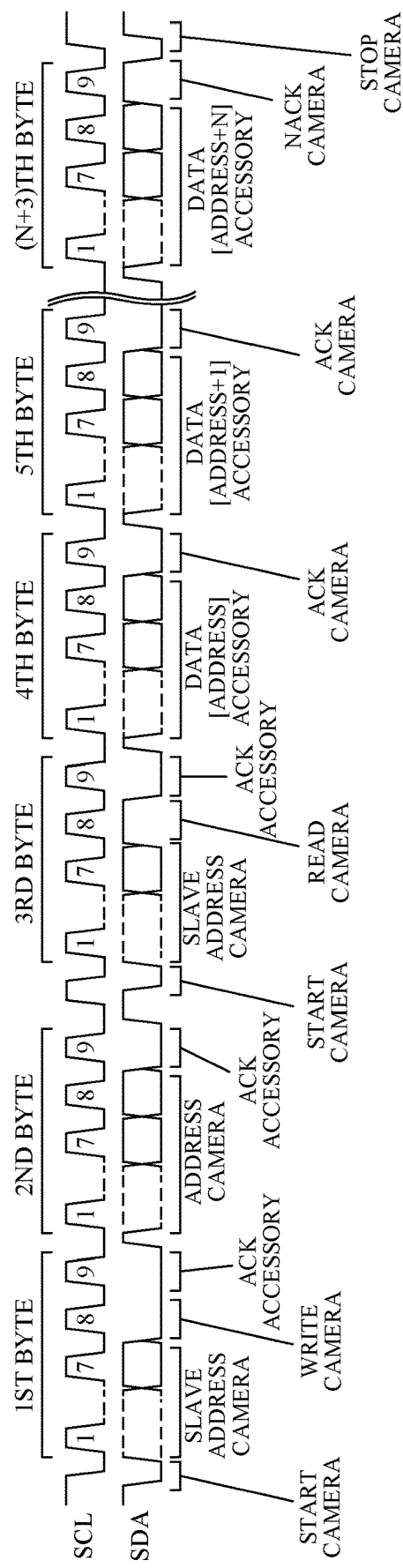

FIGS. 13A and 13B illustrate examples of I2C communication waveforms. FIG. 13A illustrates a waveform example in a case where the camera transmits N-byte data (DATA [1] to DATA [N]) to the accessory, and FIG. 13B illustrates a waveform example in a case where the camera receives N-byte data (DATA [1] to DATA [N]) from the accessory. In FIGS. 13A and 13B, an upper waveform illustrates SCL and a lower waveform illustrates SDA.

Illustrated below the SDA waveform are the meaning of a signal at each timing and whether a control circuit for controlling the output level of the SDA signal is the camera control circuit A 101 or the accessory control circuit 201. The communication data includes 1-byte unit data and 1-bit information indicating a response. A top of each figure illustrates the number of bytes of data from the communication start to facilitate a description. Since details of the communication contents will be described below with reference to FIGS. 14 to 16, an outline will be described with reference to FIGS. 13A and 13B.

In FIG. 13A, in the first-byte communication and the second-byte communication, the camera control circuit A 101 notifies the accessory control circuit 201 of storage address information on data to be transmitted. In the third-byte communication to the (N+2)th-byte communication, the camera control circuit A 101 transmits N-byte data (DATA [ADDRESS] to DATA [ADDRESS+N]) to the accessory control circuit 201.

In FIG. 13B, in the first-byte communication and the second-byte communication, the camera control circuit A 101 notifies the accessory control circuit 201 of storage address information on data to be received. In the third-byte communication to the (N+3)th-byte communication, the camera control circuit A 101 receives N-byte data (DATA [ADDRESS] to DATA [ADDRESS+N]) from the accessory control circuit 201.

Figure 14:
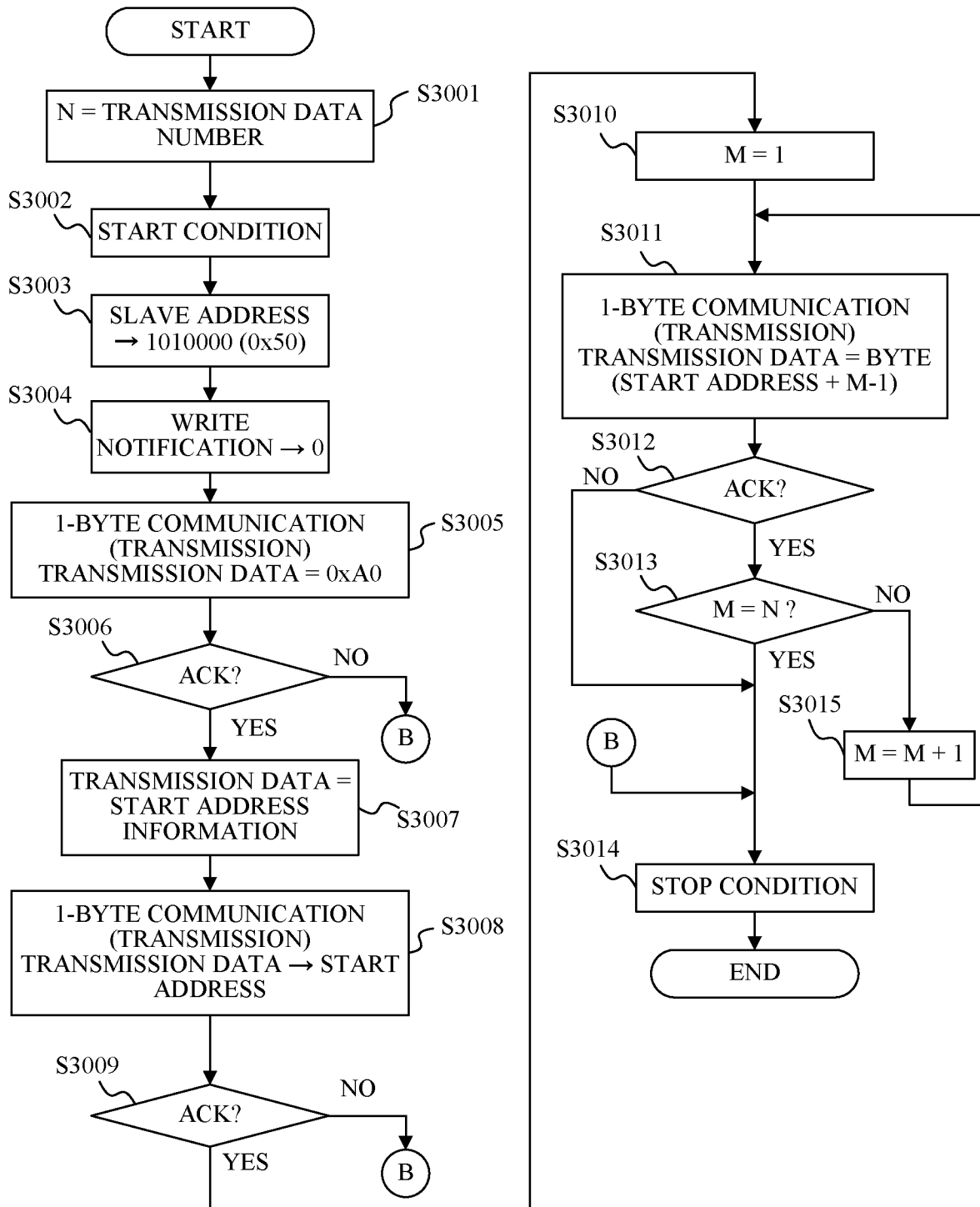
FIG. 14 illustrates processing to be performed by the camera control circuit A in the case where N-byte data is transmitted from the camera control circuit A to the accessory control circuit in this embodiment.

Next, flowcharts of FIGS. 14 to 16 will be described. The flowchart in FIG. 14 illustrates processing to be performed by the camera control circuit A 101 when the camera control circuit A 101 transmits N-byte data to the accessory control circuit 201.

In the step S3001, the camera control circuit A 101 stores a numerical value indicating the number of bytes to be transmitted in internal variable N. For example, when 3 bytes are transmitted, 3 is stored. In this embodiment, 3 is stored.

In the step S3002, the camera control circuit A 101 changes SDA to a low level while SCL is at a high level (START condition). Thereby, the accessory control circuit 201 is notified of a communication start.

In the step S3003, the camera control circuit A 101 sets slave address information indicating a slave address of the accessory control circuit 201 to the upper 7 bits of the transmission data. In this embodiment, assume that the slave address of the accessory control circuit 201 is 1010000 in binary.

In the step S3004, the camera control circuit A 101 sets information indicating that it is write communication to the lower 1 bit of the transmission data. Setting this bit to 0 means the write communication.

In the step S3005, the camera control circuit A 101 transmits to the accessory control circuit 201 data that has been set as the transmission data in the steps S3003 and S3004 (10100000 in binary and 0xA0 in hexadecimal).

In the step S3006, the camera control circuit A 101 outputs SCL for one clock and confirms the signal level of SDA after transmitting the 1-byte data. In the case where the signal level of SDA is low, it is determined to be a data reception notification (ACK) from the accessory control circuit 201 and the flow proceeds to the step S3007. On the other hand, in the case where the signal level of SDA is high, it is determined that the accessory control circuit 201 has not normally received the data and the flow proceeds to the step S3014.

In the step S3007, the camera control circuit A 101 sets to transmission data the storage address information (start address information) of the data to be transmitted to the accessory control circuit 201. In this embodiment, the size of the start address information is 1 byte, and the value is 0x00.

In the step S3008, the camera control circuit A 101 transmits the set 1-byte start address information (value 0x00) to the accessory control circuit 201.

In the step S3009, the camera control circuit A 101 outputs SCL for one clock and confirms the signal level of SDA after transmitting the 1-byte start address information data. In the case where the signal level of SDA is low, it is determined to be a data reception notification (ACK) from the accessory control circuit 201 and the flow proceeds to the step S3010. On the other hand, in the case where the signal level of SDA is high, it is determined that the accessory control circuit 201 has not normally received the data and the flow proceeds to the step S3014.

In the step S3010, the camera control circuit A 101 stores 1 in internal variable M. The internal variable M is a variable for counting the number of transmission data.

In the step S3011, the camera control circuit A 101 outputs 1-byte data to the accessory control circuit 201 by outputting 1-byte SCL and by changing SDA to the desired signal level while SCL is at a low level. Here, the start address information is 0x00 and the internal variable M is 1, and thus 1-byte data corresponding to the address 0x00 is transmitted.

In the step S3012, the camera control circuit A 101 outputs SCL for one clock and confirms the signal level of SDA after transmitting the 1-byte data. In the case where the signal level of SDA is low, it is determined to be a data reception notification (ACK) from the accessory control circuit 201 and the flow proceeds to the step S3013. On the other hand, in the case where the signal level of SDA is high, it is determined that the accessory control circuit 201 has not normally received the data and the flow proceeds to the step S3014.

In the step S3013, the camera control circuit A 101 confirms whether the internal variable M has the same value as that of the internal variable N. In the case where the internal variable M has the same value as that of the internal variable N, it is determined that the transmissions of all data have been completed and the flow proceeds to the step S3014. In the case where the internal variable M is not the same value as that of the internal variable N, it is determined that there are still data to be transmitted and the flow proceeds to the step S3015.

In the step S3015, the camera control circuit A 101 adds 1 to the internal variable M and the flow returns to the step S3011.

Thus, after the flow returns to the step S3011, the camera control circuit A 101 sequentially increments the addresses of the data to be transmitted, and transmits 1-byte data corresponding to each address. In this way, the camera control circuit A 101 transmits N-byte data to the accessory control circuit 201 by repeatedly transmitting 1-byte data until the internal variable M and the internal variable N have the same value in the processing in the step S3013. In the case where the internal variable N is set to 3 as in this embodiment, 3-byte data can be transmitted.

In the step S3014, the camera control circuit A 101 changes SDA to a high level while SCL is at a high level (STOP condition). Thereby, the accessory control circuit 201 is notified of a communication end.

Figure 15:
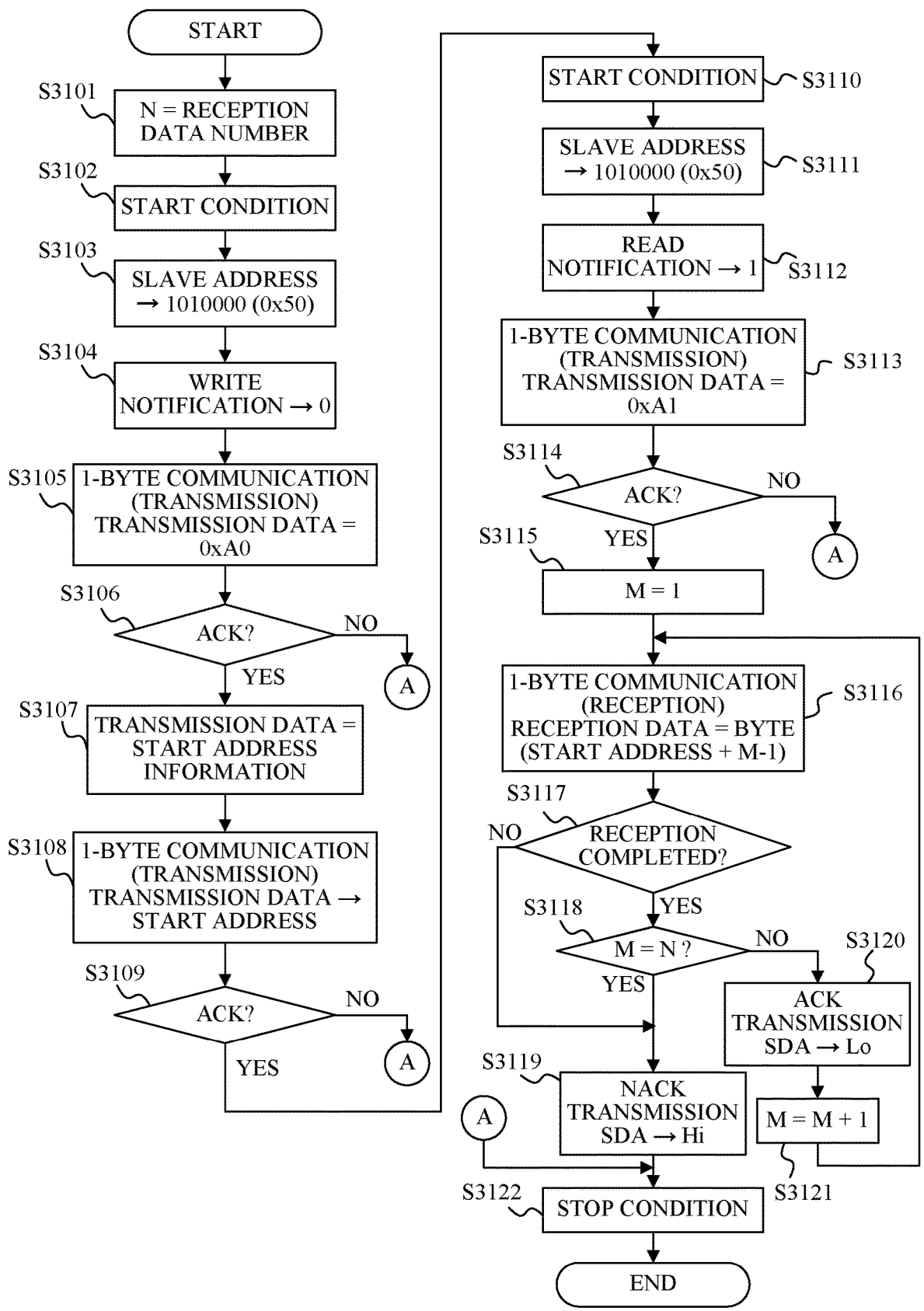
FIG. 15 illustrates processing to be performed by the camera control circuit A in the case where the camera control circuit A receives N-byte data from the accessory control circuit in this embodiment.

A flowchart in FIG. 15 illustrates processing to be performed by the camera control circuit A 101 when the camera control circuit A 101 receives N-byte data from the accessory control circuit 201.

In the step S3101, the camera control circuit A 101 stores a numerical value indicating the number of bytes to be received in internal variable N. For example, in the case where 3-byte data is received, 3 is stored. In this embodiment, 3 is stored.

In the step S3102 to the step S3106, the camera control circuit A 101 performs the same processing as the step S3002 to the step S3006, respectively, and thus a description thereof will be omitted.

In the step S3107, the camera control circuit A 101 sets to transmission data storage address information (start address information) of the data received from the accessory control circuit 201. In this embodiment, the size of the start address information is 1 byte, and the value is 0x00.

In the step S3108, the camera control circuit A 101 transmits the set 1-byte start address information (value 0x00) to the accessory control circuit 201.

In the step S3109, the camera control circuit A 101 outputs SCL for one clock and confirms the signal level of SDA after transmitting the 1-byte start address information data. In the case where the signal level of SDA is low, it is determined to be a data reception notification (ACK) from the accessory control circuit 201 and the flow proceeds to the step S3110. On the other hand, in the case where the signal level of SDA is high, it is determined that the accessory control circuit 201 has not normally received the data and the flow proceeds to the step S3122.

In the step S3110, the camera control circuit A 101 changes SDA to a low level while SCL is at a high level, and notifies the accessory control circuit 201 of the START condition, as in the step S3102.

In the step S3111, the camera control circuit A 101 sets slave address information indicating a slave address of the accessory control circuit 201 to the upper 7 bits of the transmission data. In this embodiment, assume that the slave address of the accessory control circuit 201 is 1010000 in binary.

In the step S3112, the camera control circuit A 101 sets the information indicating that it is read communication to the lower 1 bit of the transmission data. Setting this bit to 1 means read communication.

In the step S3113, the camera control circuit A 101 transmits to the accessory control circuit 201 data (10100001 in binary and 0xA1 in hexadecimal) that has been set as the transmission data in the steps S3003 and S3004.

In the step S3114, the camera control circuit A 101 outputs SCL for one clock and confirms the signal level of SDA after transmitting the 1-byte data. In the case where the signal level of SDA is low, it is determined to be a data reception notification (ACK) from the accessory control circuit 201 and the flow proceeds to the step S3115. On the other hand, in the case where the signal level of SDA is high, it is determined that the accessory control circuit 201 has not normally received the data, and the flow proceeds to the step S3122.

In the step S3115, the camera control circuit A 101 stores 1 in internal variable M. The internal variable M is a variable for counting the number of reception data.

In the step S3116, the camera control circuit A 101 outputs 1-byte SCL and reads the signal level of SDA at a timing when SCL changes from a low level to a high level. This configuration enables the 1-byte data to be received from the accessory control circuit 201. The received 1-byte data can be stored in the volatile memory 125 or used for predetermined processing as data corresponding to the address 0x00.

In the step S3117, the camera control circuit A 101 determines whether or not 1-byte data has normally been received. In the case of the normal reception, the flow proceeds to the step S3118. Without the normal reception, the flow proceeds to the step S3119.

In the step S3118, the camera control circuit A 101 confirms whether the internal variable M has the same value as that of the internal variable N. If the internal variable M has the same value as that of the internal variable N, it is determined that the receptions of all data have been completed and the flow proceeds to the step S3119. If the internal variable M is not the same value as that of the internal variable N, it is determined that there are still data to be received and the flow proceeds to the step S3120.

In the step S3120, the camera control circuit A 101 provides the accessory control circuit 201 with a data reception notification (ACK) and notifies it of performing continuous data communication by outputting 1-byte SCL and by performing control for changing SDA to a low level.

In the step S3121, the camera control circuit A 101 adds 1 to the internal variable M and the flow returns to the step S3116.

Thus, after the flow returns to the step S3116, the camera control circuit A 101 sequentially increments the address of the data to be received, and receives 1-byte data corresponding to each address. In this way, the camera control circuit A 101 receives N-byte data from the accessory control circuit 201 by repeatedly receiving 1-byte data until the internal variable M and the internal variable N have the same value in the processing in the step S3118. In the case where the internal variable N is set to 3 as in this embodiment, 3-byte data can be received.

In the step S3119, the camera control circuit A 101 outputs 1-byte SCL and performs control for changing SDA to a high level to notify the accessory control circuit 201 that the data communication has been completed (NACK).

In the step S3122, the camera control circuit A 101 changes SDA to a high level while SCL is at the high level (STOP condition). Thereby, the accessory control circuit 201 is notified of a communication end.

Figure 16A:
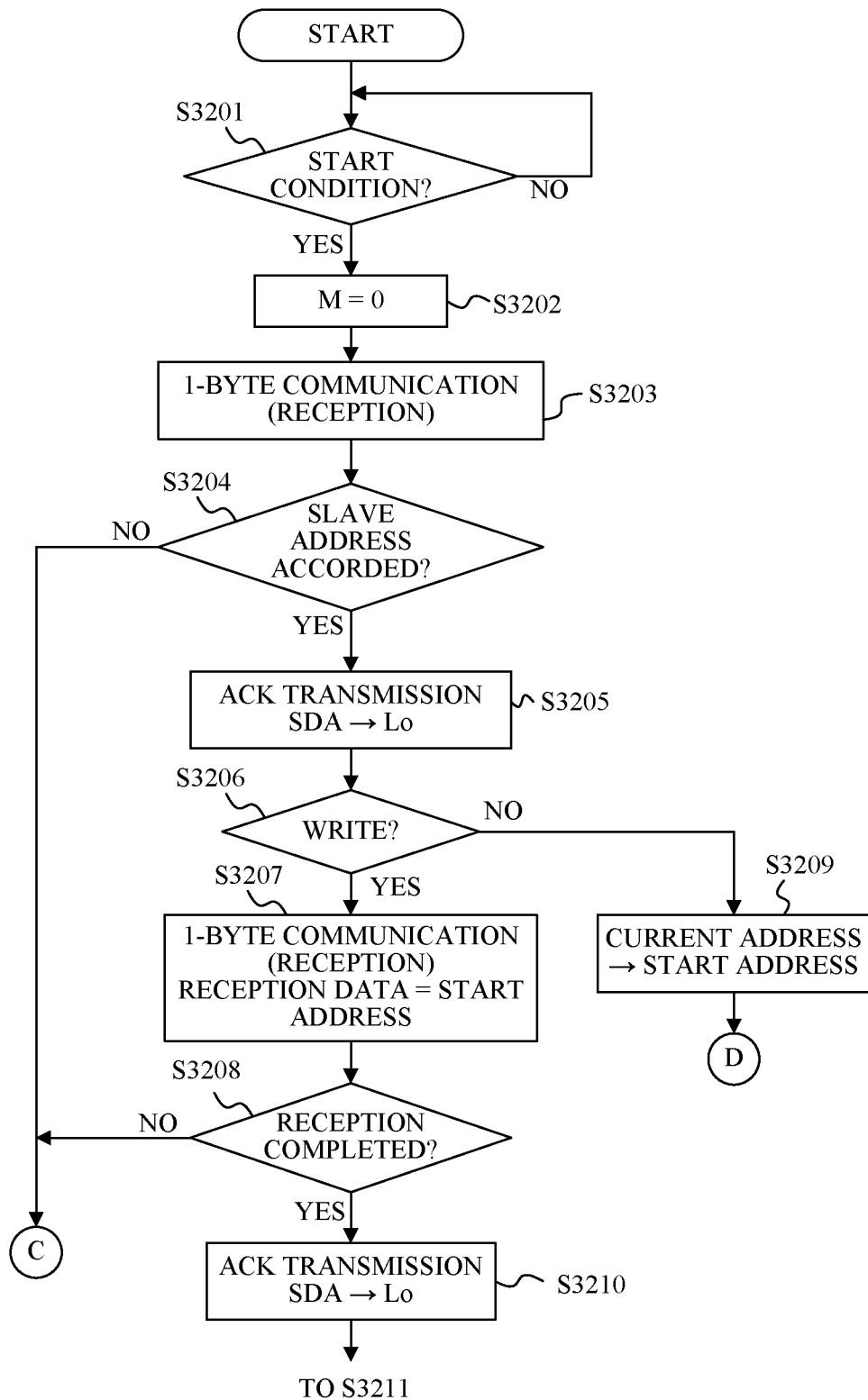
FIGS. 16A and 16B illustrate processing to be performed by the accessory control circuit in the case where N-byte data is communicated between the camera control circuit A and the accessory control circuit in this embodiment.
Figure 16B:
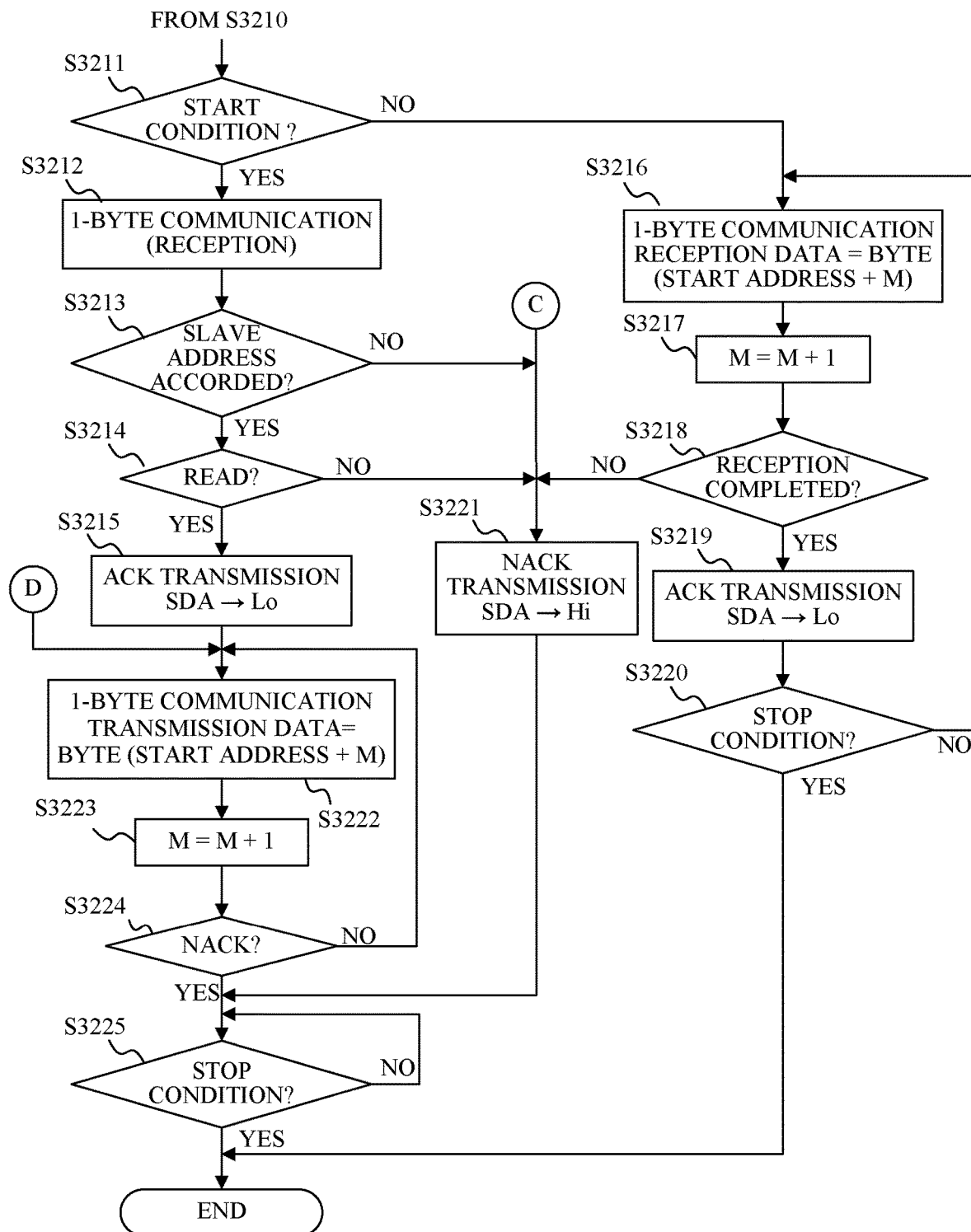

FIGS. 16A and 16B illustrate processing to be performed by the accessory control circuit 201 in the case where the camera control circuit A 101 transmits N-byte data to the accessory control circuit 201 and in the case where the camera control circuit A 101 receives N-byte data from the accessory control circuit 201.

In the step S3201, the accessory control circuit 201 waits for SDA to change to a low level (START condition) while SCL is at the high level. When the accessory control circuit 201 detects the START condition, the flow proceeds to the step S3202.

In the step S3202, the accessory control circuit 201 stores 0 in internal variable M. The internal variable M is a variable for counting the number of transmission data and the number of reception data.

In the step S3203, the accessory control circuit 201 receives 1-byte data transmitted from the camera control circuit A 101.

In the step S3204, the accessory control circuit 201 determines whether the upper 7-bit data of the 1-byte data received in the step S3203 accords with the slave address (0x50 in this embodiment) of the accessory control circuit 201. In the case where the address accords with the slave address of the accessory control circuit 201, the flow proceeds to the step S3205. In the case where the address does not accord with the slave address of the accessory control circuit 201, the flow proceeds to the step S3221.

In the step S3205, the accessory control circuit 201 provides a data reception notification (ACK) to the camera control circuit A 101 by performing control for changing SDA to a low level for the next SCL clock output after receiving the 1-byte data.

In the step S3206, the accessory control circuit 201 determines the type of data for the next 1-byte communication based on the lower 1-bit data of the 1-byte data received in the step S3203. In the case where the lower 1-bit data is 0, it is determined that the data of the next 1-byte communication is start address information from the camera control circuit A 101 to the accessory control circuit 201 and the flow proceeds to the step S3207. In the case where the lower 1-bit data is 1, it is determined that the data of the next 1-byte communication is transmission data from the accessory control circuit 201 to the camera control circuit A 101 and the flow proceeds to the step S3209.

In the step S3207, the accessory control circuit 201 receives 1-byte data transmitted from the camera control circuit A 101. The received 1-byte data is information indicating addresses in which data to be transmitted and received in the subsequent communication is stored. In this embodiment, assume that start address information is 0x00 as described with reference to FIGS. 14 and 15.

On the other hand, in the step S3209, the accessory control circuit 201 uses, for the start address information, address information previously stored in the accessory control circuit 201 or the address information previously notified from the camera control circuit A 101.

In the step S3208, in the case where the accessory control circuit 201 determines that the 1-byte data could normally be received, the flow proceeds to the step S3210. In the case where it is determined that the 1-byte data could not normally be received, the flow proceeds to the step S3221.

In the step S3210, the accessory control circuit 201 provides a data reception notification (ACK) to the camera control circuit A 101 by performing control for changing SDA to a low level for the next SCL clock output after receiving the 1-byte data.

In the step S3211, the accessory control circuit 201 confirms whether SDA has changed to the low level (START condition) while SCL is at a high level. In the case where the accessory control circuit 201 detects the START condition, the accessory control circuit 201 determines that 1-byte data to be communicated next is data to be transmitted from the camera control circuit A 101 to the accessory control circuit 201 and indicating a slave address and a communication type. Then, the flow proceeds to the step S3212. In the case where the accessory control circuit 201 does not detect the START condition, the accessory control circuit 201 determines that the 1-byte data to be communicated next is data information received by the accessory control circuit 201 from the camera control circuit A 101. Then, the flow proceeds to the step S3216.

In the step S3212, the accessory control circuit 201 receives the 1-byte data transmitted from the camera control circuit A 101.

In the step S3213, the accessory control circuit 201 determines whether the upper 7-bit data of the 1-byte data received in the step S3212 accords with the slave address (0x50 in this embodiment) of the accessory control circuit 201. In the case where the upper 7-bit data accords with the slave address of the accessory control circuit 201, the flow proceeds to the step S3214. In the case where the upper 7-bit data does not accord with the slave address of the accessory control circuit 201, the flow proceeds to the step S3221.

In the step S3214, the accessory control circuit 201 determines a data type for the next 1-byte communication based on the lower 1-bit data of the 1-byte data received in the step S3203. In the case where the lower 1-bit data is 0, the flow proceeds to the step S3221. In the case where the lower 1-bit data is 1, it is determined that the data of the next 1-byte communication is transmission data from the accessory control circuit 201 to the camera control circuit A 101 and the flow proceeds to the step S3215.

In the step S3215, the accessory control circuit 201 provides a data reception notification (ACK) to the camera control circuit A 101 by performing control for changing SDA to a low level for the next SCL clock output after receiving the 1-byte data.

In the step S3222, the accessory control circuit 201 transmits to the camera control circuit A 101 1-byte data corresponding to the start address information received from the camera control circuit A 101 in the step S3207 or the start address information determined in the step S3209.

In the step S3223, the accessory control circuit 201 adds 1 to the internal variable M, and the flow proceeds to the step S3224.

In the step S3224, the accessory control circuit 201 confirms the signal level of SDA after transmitting the 1-byte data. In the case where the signal level of SDA is high, the camera control circuit A 101 determines that it is a notification (NACK) that all data has been received, and the flow proceeds to the step S3225. On the other hand, in the case where the signal level of SDA is high, it is determined that the camera control circuit A 101 continues to request a data transmission from the accessory control circuit 201, and the flow returns to the step S3222. Thus, after the flow returns to the step S3222, the accessory control circuit 201 sequentially increments the address of the data to be transmitted, and transmits 1-byte data corresponding to each address. Thus, by repeatedly transmitting the 1-byte data from the camera control circuit A 101 until NACK is notified in the processing in the step S3224, the accessory control circuit 201 transmits N-byte data to the camera control circuit A 101.

In the step S3225, the accessory control circuit 201 waits for a STOP condition in which the SDA changes to a high level while SCL is at a high level. When the accessory control circuit 201 detects the STOP condition, the communication is terminated.

On the other hand, in the step S3216, the accessory control circuit 201 receives 1-byte data, and stores the 1-byte data in an unillustrated nonvolatile memory as data corresponding to the start address information received from the camera control circuit A 101 in the step S3207 or uses it for predetermined processing.

In the step S3217, the accessory control circuit 201 adds 1 to the internal variable M and the flow proceeds to the step S3218.

In the step S3218, if the accessory control circuit 201 determines that 1-byte data could normally be received, the flow proceeds to the step S3219. If it is determined that the 1-byte data could not normally be received, the flow proceeds to the step S3221.

In the step S3219, the accessory control circuit 201 provides a data reception notification (ACK) to the camera control circuit A 101 by performing control for changing SDA to a low level for the next SCL clock output after receiving the 1-byte data.

In the step S3230, the accessory control circuit 201 confirms whether SDA changes to a high level (STOP condition) while SCL is at a high level. In the case where the accessory control circuit 201 detects the STOP condition, the accessory control circuit 201 terminates the communication. On the other hand, in the case where the accessory control circuit 201 does not detect the STOP condition, the accessory control circuit 201 determines that data will be continuously transmitted from the camera control circuit A 101 to the accessory control circuit 201. Then, the flow returns to the step S3216.

Thus, after the flow returns to the step S3216, the accessory control circuit 201 sequentially increments an address of data to be received, and receives 1-byte data corresponding to each address. By repeatedly receiving the 1-byte data until the STOP condition is notified in the step S3220, the accessory control circuit 201 receives N-byte data from the camera control circuit A 101.

FIG. 4 explains accessory information that the accessory 200 has in an unillustrated nonvolatile memory. As illustrated in FIG. 4, the accessory information is mapped in the memory space at addresses 0x00 to 0x0F, and the accessory information can be read out of the accessory 200 by the I2C communication. In the I2C communication according to this embodiment, a checksum value for read data is added as the final data of the communication. Details of the accessory information will be described below.

An FNC1 signal connected to the contact TC14, an FNC2 signal connected to the contact TC15, an FNC3 signal connected to the contact TC16, and an FNC4 signal connected to the contact TC17 are functional signals whose function is variable according to the type of the attached accessory 200. For example, in the case where the accessory 200 is a microphone device, a signal communicated via TC15 is a voice data signal, and in the case where the accessory 200 is an illumination device (strobe device), a signal communicated via TC 14 is a signal that notifies the light emission timing.

A signal that realizes a different function may be communicated via the same contact depending on the type of the attached accessory. For example, in a case where the accessory 200 is an accessory other than an illumination device, a synchronization signal for controlling a timing different from a light emission timing may be communicated via TC14. TC14 to TC17 correspond to functional signal contacts. Communication using at least one of the functional signal contacts will be also referred to as functional signal communication.

The functional signal communication can be executed at a timing independent of the I2C communication and SPI communication in parallel with the I2C communication and SPI communication.

The accessory type, as used herein, means the above microphone device, illumination device, etc. Accessories that achieve the same purpose, such as illuminations with different performances, belong to the same type of accessories. Accessories that achieve different purposes, such as a microphone device and an illumination device, are different types of accessories.

The functional signal communication is executed based on information acquired by the I2C communication or the SPI communication.

The contact TC18 as a second ground contact is also connected to GND, and is a contact that serves as a reference potential for the camera 100 and the accessory 200, similarly to the contact TC04. A differential signal D2N connected to the contact TC19 and a differential signal D2P connected to the contact TC20 are data communication signals in which they perform data communications in pairs, and are connected to the camera control circuit B 102. For example, USB communication can be performed via TC19 and TC20. The contact TC21 is connected to GND and can be used not only as a reference potential contact but also as a contact for controlling wiring impedances of the differential signals D2N and D2P. The contact TC21 corresponds to a fourth ground contact.

The contacts TC01, TC04, TC06, TC18, and TC21 are connected to, for example, a GND portion of a flexible printed circuits (FPC) substrate, and the GND portion of the FPC substrate is fixed to a metallic member which serves as the GND level of the camera 100, with a screw or the like.

The metallic member serving as the GND level includes, for example, an engagement member engageable with the accessory 200 in the accessory shoe portion, an unillustrated base plate inside the camera 100, and the like.

In this embodiment, the attachment detecting contact TC06 to which the accessory attachment detecting signal/ACC_DET is connected is disposed next to the contact (first clock contact) TC07 that transmits the clock signal SCLK (first clock signal). In general, noise (clock noise) associated with a potential fluctuation of a clock signal is transmitted to a contact adjacent to the contact of the clock signal, which may cause malfunction. In particular, this influence is significant in a configuration that has many contacts and a short distance between the contacts as in this embodiment. Accordingly, by disposing the attachment detecting contact TC06 next to the SCLK contact TC07, the influence of the clock noise can be suppressed.

The accessory attachment detecting signal/ACC_DET is pulled up before the accessory is attached, but is set to the GND potential after the accessory is attached. On the other hand, since the SCLK contact TC07 for transmitting the clock signal does not transmit the clock signal and the potential does not fluctuate before the accessory is attached. The potential fluctuates because the clock signal is transmitted only after the accessory is attached.

When the SCLK contact TC07 transmits a clock signal, the attachment detecting contact TC06 is at a GND potential. Therefore, even if the attachment detecting contact TC06 receives clock noise, the potentials of the control circuits of the camera 100 and the accessory 200 are less likely to fluctuate, so that malfunction can be prevented. In addition, the clock noise can be restrained from transmitting to a position farther than the attachment detecting contact TC06. As a result, it is unnecessary to provide a GND terminal, and thus the influence of clock noise can be suppressed without increasing the number of contacts.

SCL (second clock signal) as a clock signal is also transmitted to the contact (second clock contact) TC13. However, SCLK transmitted to the SCLK contact TC07 has a higher frequency than that of SCL, and the SCLK contact TC07 generates more clock noise than the SCL contact TC13. Therefore, disposing the attachment detecting contact TC06 next to the SCLK contact TC07 instead of next to the SCL contact TC13 is more effective in preventing malfunction caused by clock noise.

In addition to the difference in frequency, SCL transmitted by the SCL contact TC13 is a clock signal of an I2C communication standard, and a voltage fluctuation of a signal line is driven by the open-drain connection. On the other hand, SCLK transmitted by the SCLK contact TC07 is a clock signal of an SPI communication standard, and a voltage fluctuation of a signal line is driven by the CMOS output. Therefore, the SCL contact TC13 tends to have a gentler edge of the voltage fluctuation than that of the SCLK contact TC07, and clock noise is less likely to occur. Hence, disposing the attachment detecting contact TC06 next to the SCLK contact TC07 rather than next to the SCL contact TC13 is more effective in preventing malfunction caused by clock noise.

The differential signals DIN and D1P may be transmitted in pairs to the first and second differential signal contacts TC19 and TC20 to transmit the clock signal. In that case, a clock signal (third clock signal) having a higher frequency than those of the SCLK contact TC07 and the SCL contact TC13 may be transmitted. However, the differential signals D1N and D1P are pair signals, and thus the clock noise emission is less than those of the SCLK contact TC07 and the SCL contact TC13 that transmit single-ended signals. Therefore, it is more effective to prevent malfunction caused by the clock noise by disposing the attachment detecting contact TC06 next to the SCLK contact TC07 instead of next to the first and second differential signal contacts TC19 and TC20.

The contact (first data contact) TC08 disposed next to the SCLK contact TC07 on the opposite side of the attachment detecting contact TC06 transmits MOSI (first data signal). Since MOSI is a data signal, it appears that MOSI is susceptible to clock noise. However, MOSI is a data signal of the same SPI communication standard as the clock signal transmitted by the SCLK contact TC07, and thus the potential fluctuation timing is synchronized with the clock signal and is less likely to be affected by the clock noise. Therefore, the contact TC08 does not have to be fixed to the GND potential and can be used as the MOSI contact.

The accessory 200 has a battery 205 and receives power supply from the battery 205 and also receives power supply from the camera 100 via the camera connector 141 and the accessory connector 211. The accessory control circuit 201 as a control unit of the accessory 200 is a circuit that controls the entire accessory 200, and includes a processor (microcomputer) that includes a CPU etc.

The accessory power supply circuit 202 is a circuit that generates a power supply for supplying power to each circuit in the accessory 200, and includes a DC/DC converter circuit, LDO, a charge pump circuit, and the like. A voltage of 1.8V generated by the accessory power supply circuit 202 is constantly supplied as accessory microcomputer power supply VMCU_A to the accessory control circuit 201. The voltage generated by the accessory power supply circuit 202 may be different from 1.8V. Control over the accessory power supply circuit 202 can provide turning-on and off control over the power supply to each circuit in the accessory 200.

A charging circuit 204 is a circuit for charging the battery 205 using the electric power supplied from the camera 100. The accessory control circuit 201 controls the charging circuit 204 to charge the battery 205 in the case where the accessory control circuit 201 can determine that sufficient power is supplied from the camera 100 to perform a charging operation. In this embodiment, the battery 205 is attached to the accessory 200, but the accessory 200 may be operated only by a power supply from the camera 100 without attaching the battery 205. In this case, the charging circuit 204 is unnecessary.

A differential communication circuit 207 is a circuit for performing differential communication with the camera 100, and can communicate data with the camera 100. An external communication IF circuit 208 is an IF circuit for performing data communication with an unillustrated external device, such as an Ethernet communication IF, a wireless LAN communication IF, and a public network communication IF.

The accessory control circuit 201 controls the differential communication circuit 207 and the external communication IF circuit 208 to transmit data received from the camera 100 to the external device and data received from the external device to the camera 100. The functional circuit 206 is a circuit having different functions depending on the type of the accessory 200. The functional circuit 206 is, for example, a light-emitting circuit, a charging circuit, or the like in the case where the accessory 200 is a strobe device. In the case where the accessory 200 is a microphone device, it is a voice codec circuit, a microphone circuit, or the like.

An external connection terminal 209 is a connector terminal for connection to an external device, and is a USB TYPE-C connector in this embodiment. A connection detecting circuit 210 is a circuit for detecting that an external device has been connected to the external connection terminal 209. The accessory control circuit 201 can detect the connection of the external device to the external connection terminal 209 by receiving an output signal of the connection detecting circuit 210.

A power supply switch 203 is a switch for turning on and off the operation of the accessory 200. The accessory control circuit 201 can detect a turning-on position and a turning-off position by reading a signal level of a terminal to which the power supply switch 203 is connected.

An operation switch 212 is a switch for operating the accessory 200 and includes a button, a cross key, a slide switch, a dial switch, and the like. When the operation switch 212 is operated, the accessory control circuit 201 detects the operation and executes predetermined processing according to the operation.

An accessory connector 211 is a connector electrically connectable to the camera 100 via 21 contacts TA01 to TA21 that are arranged in a row. The contacts TA01 to TA21 are arranged in this order from one end to the other end in the arrangement direction.

The contact TA01 is connected to GND and serves not only as a reference potential contact but also as a contact for controlling wiring impedances of the differential signals D1N and D1P. The contact TA01 corresponds to a third ground contact.

The differential signal D1N connected to the contact TA02 and the differential signal D1P connected to the contact TA03 are data communication signals in which they perform data communication in pairs, and are connected to the differential communication circuit 207. The contacts TA02, TA03, TA07 to TA17 described below, TA19 and TA20 are communication contacts.

The contact TA04 as a first ground contact is connected to GND and serves as a reference potential contact for the camera 100 and the accessory 200. The contact TA04 is disposed outside the contact TA05 described below in the arrangement direction of the contacts. The accessory power supply circuit 202 and the charging circuit 204 are connected to TA05 as a power supply contact, and the accessory power supply VACC supplied from the camera 100 is connected to the contact TA05. The contact TA06 as an attachment detecting contact is directly connected to GND. When the accessory 200 is attached to the camera 100, the contact TA06 turns the accessory attachment detecting signal/ACC_DET described above to a low level (GND potential). Thereby, the camera 100 can detect the attachment of the accessory 200. SCLK connected to the contact TA07 as a communication contact, MOSI connected to the contact TA08, MISO connected to the contact TA09, and CS connected to the contact TA10 are signals for the accessory control circuit 201 to act as a communication slave to perform SPI communication.

A communication request signal /WAKE for requesting communication from the accessory control circuit 201 to the camera 100 is connected to the contact TAU. When the accessory control circuit 201 determines that communication with the camera 100 is necessary, the accessory control circuit 201 requests the camera 100 for communication by changing the communication request signal /WAKE to a low output.

When power is supplied from the camera control circuit 101 to the accessory 200 via TC5 in response to detecting an attachment of the accessory 200, the accessory control circuit 201 notifies the camera control circuit 101 that the power supply has been received by changing the signal level (by changing the potential) of the communication request signal /WAKE from a high level to a low level.

The accessory control circuit 201 can notify that there is a factor that causes the accessory 200 to communicate with the camera 100 by changing the signal level (potential) of the communication request signal /WAKE from a high level to a low level even if there is no request from the camera. With this configuration, the camera control circuit 101 can omit an operation of periodically checking, through polling, whether or not the accessory 200 has a factor that requires communication. The accessory 200 can communicate with the camera 100 on a real-time basis when the communication requiring factor occurs.

SDA connected to the contact TA12 as a communication contact and SCL connected to the contact TA13 are signals for the accessory control circuit 201 to serve as a communication slave to perform I2C communication.

An FNC1 signal connected to the contact TA14, an FNC2 signal connected to the contact TA15, an FNC3 signal connected to the contact TA16, and an FNC4 signal connected to the contact TA17 are functional signals whose functions are variable according to the type of accessory 200. For example, in the case where the accessory 200 is a microphone device, they can be voice data signals, and in the case where the accessory 200 is a strobe device, they can be signals for notifying a light emission timing.

The contact TA18 as a second ground contact is also connected to GND, and is a reference potential contact for the camera 100 and the accessory 200, similar to the contact TA04. The differential signal D2N connected to the contact TA19 and the differential signal D2P connected to the contact TA20 are data communication signals in which they perform data communication in pairs, and are connected to the external connection terminal 209. The contact TA21 is connected to GND and can be used not only as a reference potential contact but also as a terminal for controlling the wiring impedances of the differential signals D2N and D2P. TA21 corresponds to a fourth ground contact.

The contacts TA01, TA04, TA06, TA18, and TA21 are connected to, for example, the GND portion of the FPC substrate, and the GND portion of the FPC substrate is fixed to a metallic member which serves as the GND level of the accessory 200, with an unillustrated screw. The metallic member serving as the GND level includes, for example, a shoe attachment leg engageable with the accessory shoe portion of the camera 100, an unillustrated base plate inside the accessory 200, and the like.

Figure 5:
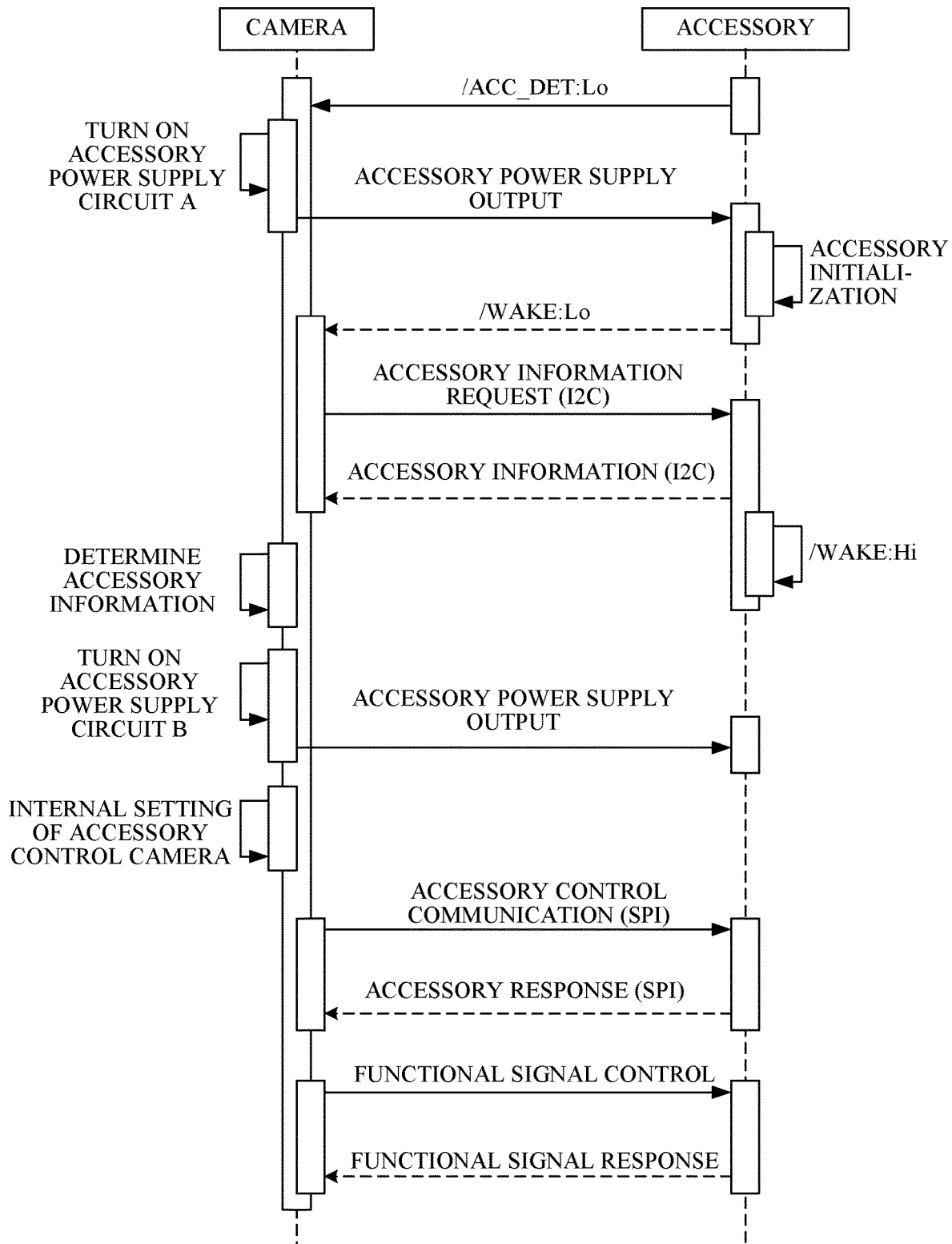
FIG. 5 is a sequence diagram showing operations of the camera and accessory in this embodiment.

FIG. 5 illustrates operations (processing) of the camera 100 and the accessory 200 when the accessory 200 is attached to the camera 100. A detailed description will now be given below of processing of each of the camera 100 and the accessory 200.

When the accessory 200 is attached to the camera 100, the accessory attachment detecting signal/ACC_DET becomes at a GND level, and the camera control circuit A 101 determines that the accessory 200 has been attached to the camera 100. When the camera control circuit A 101 determines that the accessory 200 has been attached, the camera control circuit A 101 sets power supply control signal CNT_VACC1 to a high level in order to turn on the output of the accessory power supply circuit A 131. The accessory power supply circuit A 131 outputs the accessory power supply VACC as soon as the power supply control signal CNT_VACC1 becomes at a high level.

When the accessory power supply circuit 202 receives VACC in the accessory 200, the accessory power supply circuit 202 generates the power supply VMCU_A for the accessory control circuit 201 and the accessory control circuit 201 is started. After the accessory control circuit 201 is started, the accessory control circuit 201 initializes each block in the accessory 200. Thereafter, when the accessory control circuit 201 is ready to communicate with the camera 100, the accessory control circuit 201 sets the communication request signal /WAKE to a low level.

In the camera 100, the camera control circuit A 101 detects that the accessory 200 is in a communicable state by detecting that a/WAKE terminal has become at a low level. The camera control circuit A 101 requests the accessory information by the I2C communication.

In the accessory 200, the accessory control circuit 201 transmits the accessory information in response to the accessory information request from the camera 100. The accessory control circuit 201 when transmitting the accessory information sets the communication request signal /WAKE to a high level.

In the camera 100, the camera control circuit A 101 determines whether or not the attached accessory is controllable etc. by determining the received accessory information. The camera control circuit A 101 turns on the accessory power supply circuit B 132. The camera control circuit A 101 when completing various settings for the camera 100 notifies the camera control circuit B 102 of the accessory information. The camera control circuit B 102 provides the accessory 200 with a notification of a control command and a control of a functional signal by the SPI communication based on the accessory type information. The accessory control circuit 201 responds to the control command by the SPI communication from the camera 100 and performs control in accordance with the functional signal.

A description will now be given of the accessory information illustrated in FIG. 4. D7-D0 data at address 0x00 is information indicating a type of the accessory. FIG. 6 explains accessory type information as the accessory information. For example, 0x81 indicates a strobe device, 0x82 indicates an interface conversion adapter device, 0x83 indicates a microphone device, and 0x84 indicates a multi-accessory connection adapter device for attaching a plurality of accessory devices to the camera 100.

Here, the adapter device is an intermediate accessory attached between the camera 100 and the accessory such as a strobe device and a microphone device. The interface conversion adapter device is an adapter device that converts the interface so as to provide compatibility between the camera 100 and the accessory when the interface of the camera 100 and the interface of the accessory are different. The multi-accessory connection adapter device is an adapter device to which a plurality of accessories are attachable.

D7-D0 data at address 0x01 is information indicating a model number of the accessory 200. The model of the accessory can be uniquely identified by the accessory type information described above and this information. D7-D0 data at address 0x02 is information indicating a firmware version of the accessory 200.

D7-D6 data at address 0x03 is information indicating whether or not a supply of the accessory power supply VACC to the accessory 200 is to be requested while an unillustrated power supply switch of the camera 100 is turned off. In the case where the information is 0, no power supply is requested. In the case where the information is 1, a power supply is requested by the accessory power supply circuit A 131. In the case where the information is 2, a power supply is requested by the accessory power supply circuit B 132. D5-D4 data at address 0x03 is information indicating whether or not to request the accessory 200 for a supply of the accessory power supply VACC when the camera 100 is in the power-saving mode. In the case where the information is 0, it means that no power supply is necessary. In the case where the information is 1, it means that there is a power supply requested by the accessory power supply circuit A 131. In the case where the information is 2, it means that there is a power supply requested by the accessory power supply circuit B 132. D3-D2 data at address 0x03 is information indicating whether or not the accessory 200 has the battery 205. In the case where the information is 0, it means that the accessory 200 has no battery, and in the case where the information is 1, it means that the accessory 200 has the battery. D1-D0 data at address 0x03 is information indicating whether or not the accessory 200 has a charging function for the battery 205. In the case where the information is 0, it means that the accessory 200 has no charging function, and in the case where it is 1, it means that the accessory 200 has the charging function.

D7-D0 data at address 0x04 is information indicating required power to the accessory power supply VACC with which the accessory 200 is supplied from the camera 100. A value obtained by multiplying this information by 10 indicates a current value. In a case where this information is 10, it means 100 mA, and in a case where this information is 100, it means 1 A.

In order to reduce an information amount of this information, this information may be simply associated with an arbitrary current value. For example, in the case where this information is 0, it may mean 100 mA, in the case where this information is 1, it may mean 300 mA, in the case where this information is 3, it may mean 450 mA, and in the case where this information is 4, it may mean 600 mA.

D7 data at address 0x05 is information indicating whether or not the accessory 200 is in a firmware update mode state (information indicating the operating mode of the accessory 200). In the case where the information is 0, it means that the accessory 200 is not in the firmware update mode state, and in the case where it is 1, it means that the accessory 200 is in the firmware update mode state. D6 data at address 0x05 is information indicating whether or not the accessory 200 has a firmware update function. In the case where the information is 0, it means that the accessory 200 has no firmware update function. In the case where the information is 1, it means that the accessory 200 has the firmware update function. D5-D4 data at address 0x05 is information indicating whether or not an operation of the accessory 200 that is attached to an intermediate (connection) accessory is to be permitted (supported). In the case where the information is 0, it means that the operation is not permitted, and in the case where it is 1, it means that the operation is permitted. D3-D2 data at address 0x05 is information indicating whether or not the accessory 200 needs the camera 100 to confirm an attachment state of the intermediate accessory when the camera 100 is started. In the case where the information is 0, it means that the confirmation is unnecessary, and in the case where it is 1, it means that the confirmation is necessary. D1-D0 data at address 0x05 is information indicating whether or not the accessory 200 supports a command notification by the I2C communication. In the case where this information is 0, it means that the command notification is not supported, and in the case where it is 1, it means that the command notification is supported.

D5-D4 data at address 0x06 is information indicating a communication method that can be used to notify the camera 100 of a factor of a communication request after the accessory 200 notifies the camera 100 of communication request signal /WAKE. In the case where the information is 0, it means that the I2C communication method is supported. In the case where the information is 1, it means that the SPI communication method is supported. In the case where the information is 2, it means that both the I2C communication method and the SPI communication method are supported. D3-D0 data at address 0x06 is information indicating whether or not the accessory 200 has functions corresponding to the FNC1 signal, the FNC2 signal, the FNC3 signal, and the FNC4 signal. D0 data corresponds to the FNC1 signal, D1 data corresponds to the FNC2 signal, D2 data corresponds to the FNC3 signal, and D3 data corresponds to the FNC4 signal. In the case where the value is 0, it means that the accessory 200 does not have that function. In the case where the value is 1, the accessory 200 has that function.

D7 data at address 0x0A is information indicating whether or not the accessory 200 requests the camera 100 for a start when the accessory 200 notifies the camera 100 of the communication request signal /WAKE. In the case where the information is 0, it means that the start is requested, and in the case where it is 1, it means that the start is not requested. D6-D0 data at address 0x0A is information indicating a factor of the communication request signal /WAKE of which the accessory 200 notifies the camera 100. FIG. 7 explains a factor number and a factor content of a communication request, and illustrates examples of factors of the communication request signal /WAKE. In this example, the accessory 200 is a microphone device. For example, a factor number 0x00 is a number indicating that a menu call switch in the operation switch 212 has been pressed. A factor number 0x01 is a number indicating that the accessory 200 has completed an output control of an audio signal. A factor number 0x02 is a number indicating that the accessory 200 has completed mute processing of the audio signal. Thus, the camera 100 can be notified of information on the generating factor of the communication request signal /WAKE.

D1 data at address 0x0C is information indicating an SPI communication protocol supported by the accessory 200, and in the case where the information is 0, it means that the accessory 200 supports SPI protocol A, and in the case where it is 1, it means that the accessory 200 supports SPI protocol B. D0 data at address 0x0C is information indicating a control logic of the CS signal in the SPI communication supported by the accessory 200. In the case where the information is 0, it means that the CS signal is a low-active logic, and in the case where it is 1, it means that the CS signal is a high-active logic. D7-D0 data at address 0x0D is information indicating the time required as a communication byte interval in the case where the accessory 200 performs communication in accordance with the SPI protocol A and the D7 data at the address 0x05 is 0 or the accessory 200 is not in the firmware update mode state. D7-D0 data at address 0x0E is information indicating the time required as a communication byte interval when the accessory 200 performs communication in accordance with the SPI protocol A and the D7 data at the address 0x05 is 1 or the accessory 200 is in the firmware update mode state.

FIGS. 8A and 8B explain communication data interval information on the SPI communication, and illustrates a relationship between information on data at the address 0x0D and data at the address 0x0E and the time (communication interval) between communication bytes. FIG. 8A illustrates the relationship between the time between communication bytes and the data at the address 0x0D, and FIG. 8B illustrates the relationship between the time between communication bytes and the data at the address 0x0E. D7-D0 data at the address 0x0F is information indicating a checksum.

Figure 9:
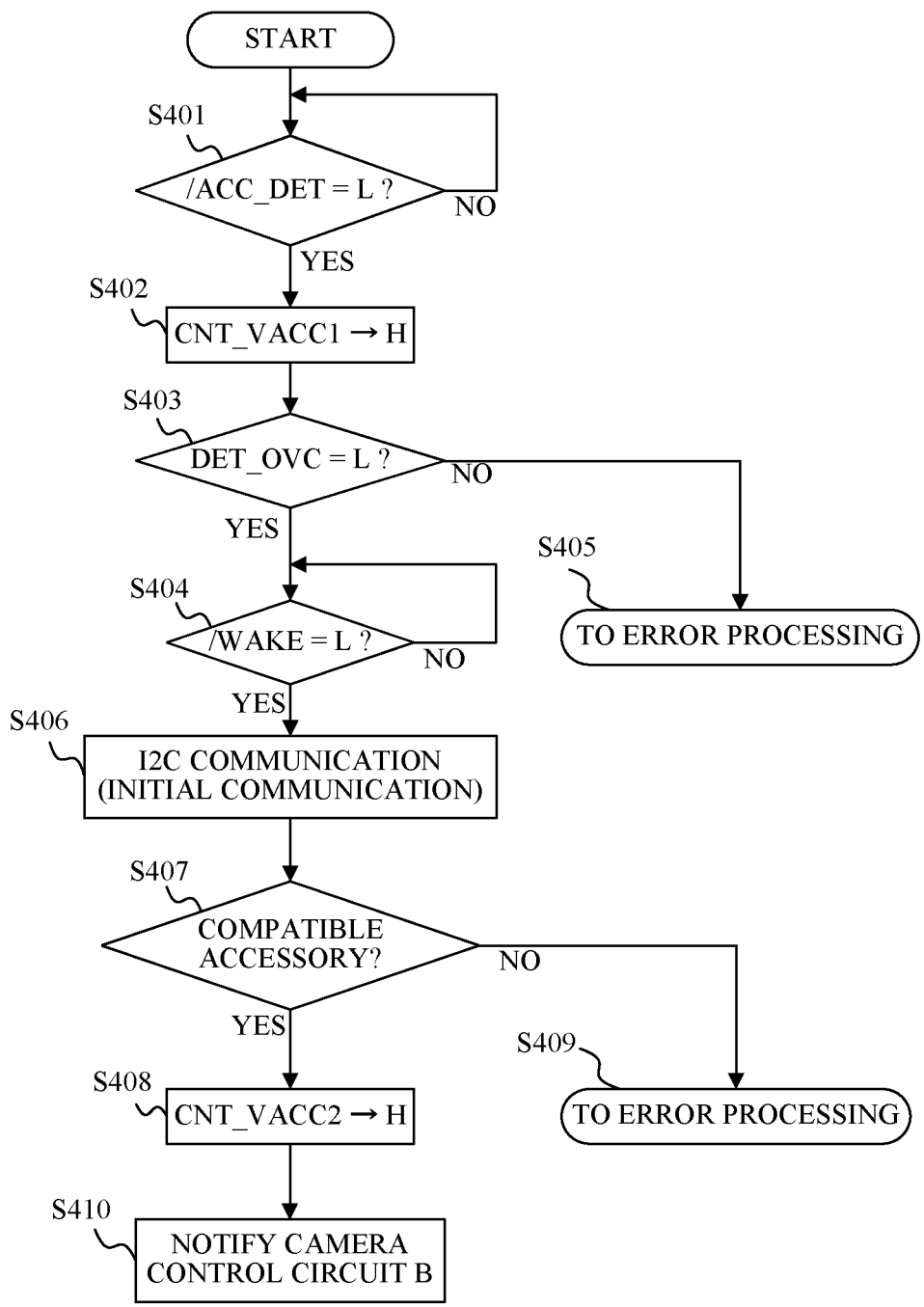
FIG. 9 is a flowchart showing an operation of the camera control circuit A in this embodiment.

FIG. 9 is a flowchart illustrating an operation of the camera control circuit A, and illustrates processing of the camera control circuit A101 from when the accessory 200 is attached to the camera 100 to when the functions of the accessory 200 are enabled.

In the step S401, the camera control circuit A 101 monitors a signal level of the accessory attachment detecting signal/ACC_DET, and determines (detects) whether or not the accessory 200 is attached. In the case where the signal level of the accessory attachment detecting signal/ACC_DET is high, the camera control circuit A 101 determines that the accessory 200 has not yet been attached and the flow returns to the step S401 so as to again determines whether the accessory 200 has been attached. In the case where the signal level is low, the camera control circuit A 101 determines that the accessory 200 is attached, and the flow proceeds to the step S402.

In the step S402, the camera control circuit A 101 performs control for changing the power supply control signal CNT_VACC1 to a high level in order to turn on the output of the accessory power supply circuit A 131 and the flow proceeds to the step S403. The accessory power supply circuit A 131 outputs the accessory power supply VACC when the power supply control signal CNT_VACC1 becomes at the high level.

In the step S403, the camera control circuit A 101 monitors a signal level of the overcurrent detecting signal DET_OVC and determines whether or not an overcurrent is flowing. In the case where the signal level of DET_OVC is low, the camera control circuit A 101 determines that no overcurrent is flowing and the flow proceeds to the step S404, and in the case where the signal level is high, the camera control circuit A 101 determines that the overcurrent is flowing, and the flow proceeds to the step S405 to perform error processing.

In the step S404, the camera control circuit A 101 monitors a signal level of the communication request signal /WAKE as a notification signal from the accessory 200, and determines whether or not an initialization of the accessory 200 has been completed. The camera control circuit A 101 determines that the initialization has been completed if the signal level of the communication request signal /WAKE is low, and the flow proceeds to the step S406. If the signal level is high, the camera control circuit A 101 determines that the initialization has not yet been completed and the flow returns to the step S404, so that the camera control circuit A 101 again determines whether the initialization has been completed.

In the step S406, the camera control circuit A 101 performs the I2C communication with the accessory 200 and reads out 15-byte accessory information. Then, the flow proceeds to the step S407. In the step S407, the camera control circuit A 101 determines whether or not the attached accessory 200 is compatible with the camera 100 based on the accessory information read out in the step S406. When the camera control circuit A 101 determines that the attached accessory 200 is compatible, the flow proceeds to the step S408, and when the camera control circuit A 101 determines that the attached accessory 200 is not compatible, the flow proceeds to the step S409 to perform error processing.

In the step S408, the camera control circuit A 101 performs control for changing the power supply control signal CNT_VACC2 to a high level in order to turn on the output of the accessory power supply circuit B 132. Then, the flow proceeds to the step S410. The accessory power supply circuit B 132 outputs the accessory power supply VACC when the power supply control signal CNT_VACC2 becomes at the high level. In this embodiment, when control is performed so as to make both the power supply control signals CNT_VACC1 and CNT_VACC2 at high levels, the output from the accessory power supply circuit B 132 is supplied to the accessory power supply VACC. In the step S410, the camera control circuit A 101 notifies the camera control circuit B 102 of the accessory information read out in the step S406 so as to complete the start flow of the camera 100 in response to the attachment of the accessory 200.

Figure 10:
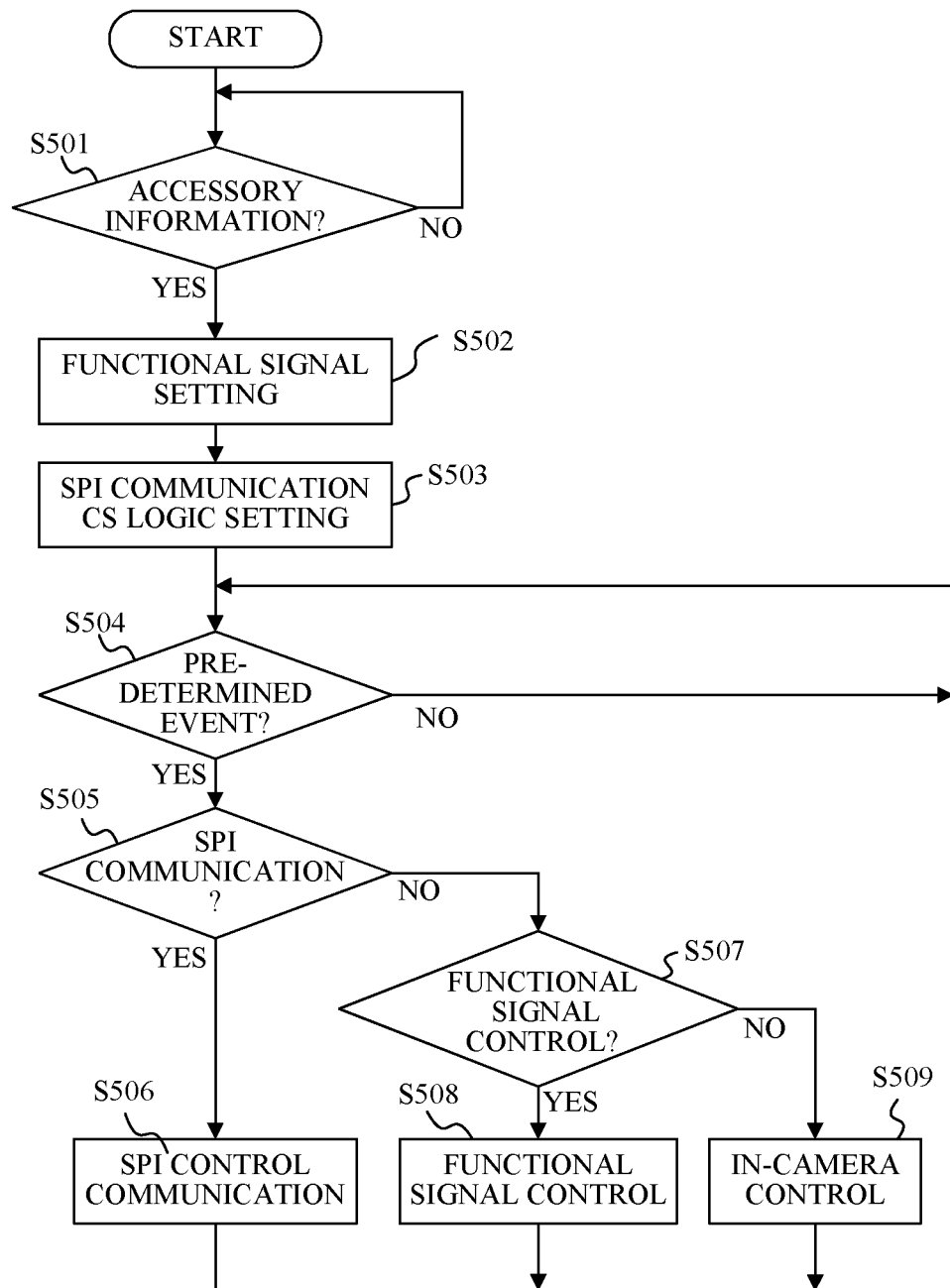
FIG. 10 is a flowchart showing an operation of the camera control circuit B in this embodiment.

FIG. 10 is a flowchart of an operation of the camera control circuit B 102 from when the accessory 200 is attached to the camera 100 to when the functions of the accessory 200 are enabled.

In the step S501, the camera control circuit B 102 determines whether or not the accessory information has been notified from the camera control circuit A 101. If the accessory information has not yet been notified, the flow returns to the step S501 and the camera control circuit B 102 again determines whether or not the accessory information has been notified (performs a detection operation). If the accessory information has been notified, the flow proceeds to the step S502.

In the step S502, the camera control circuit B 102 sets the functional signals FNC1 to FNC4 based on the accessory information notified from the camera control circuit A 101. For example, in the case where it is notified that the accessory 200 is a microphone device, FNC1 is set to function as voice data clock signal BCLK, FNC2 is set to function as voice data channel signal LRCLK, and FNC3 is set to function as voice data signal SDAT. As another example, in the case where it is notified that the accessory 200 is a strobe device, FNC 4 is set to function as strobe emission synchronization signal XOUT. For functional signals that do not require control over the accessory 200, the camera control circuit B 102 makes predetermined settings so as not to interfere with operations of the camera 100 and the accessory 200.

Next, in the step S503, the camera control circuit B 102 sets the CS control logic in the step SPI communication based on the accessory information notified from the camera control circuit A 101. Next, in the step S504, the camera control circuit B 102 determines (detects) whether or not a predetermined event for the accessory 200 has occurred. If no event has occurred, the flow returns to the step S504 and the camera control circuit B 102 again determines (detects) whether or not the event has occurred. If the event has occurred, the flow proceeds to the step S505.

In the step S505, the camera control circuit B 102 determines whether the event determined in the step S504 is an event that requires the SPI communication with the accessory 200. The flow proceeds to the step S506 if the detected event is the event that requires the SPI communication. The flow proceeds to the step S507 if the detected event is not the event that requires the SPI communication.

In the step S507, the camera control circuit B 102 determines whether or not the event determined in the step S504 is an event that requires control over the accessory 200 using the functional signal. The flow proceeds to the step S508 if the detected event is the event that requires the control using the functional signal, and the flow proceeds to the step S509 if the detected event is not the event that requires the control using the functional signal.

In the step S506, the camera control circuit B 102 performs the SPI communication with the accessory 200. The SPI communication performed in the step S506 includes, for example, communication of an instruction to turn on or off the microphone operation, communication of an instruction to switch a sound collection directivity of the microphone, communication of an instruction to switch an equalizer function of the microphone, and the like in the case where the accessory 200 is a microphone device. In the case where the accessory 200 is a strobe device, the SPI communication includes communication for reading out setting information on the strobe device, communication for notifying the strobe device of the setting information, and the like. In the case where the SPI communication in the step S506 is completed, the flow returns to the step S504 and the camera control circuit B 102 again determines whether or not the event has occurred.

In the step S508, the camera control circuit B 102 controls the accessory 200 using a functional signal. For example, in the case where the accessory 200 is a microphone device, the camera control circuit B 102 outputs the audio data clock signal BCLK of FNC1 and the audio data channel signal LRCLK of FNC2, and takes in the audio data signal SDAT of FNC3. Thereby, the camera 100 can acquire voice data from the accessory 200. In the case where the accessory 200 is a strobe device, the camera control circuit B 102 controls the strobe emission synchronization signal XOUT of FNC 4 at a predetermined timing. Thereby, the camera 100 can instruct the strobe device on a light emission. When the control using the predetermined functional signal is completed in the step S508, the flow returns to the step S504 and the camera control circuit B 102 again detects whether or not the event has occurred.

In the step S509, the camera control circuit B 102 performs predetermined in-camera control according to the event detected in the step S504. The in-camera control executed by the step S509 includes, for example, control for starting or ending recording of voice data in the recording memory 126, control for performing equalizer processing for the voice data, and the like, in the case where the accessory 200 is a microphone device. In the case where the accessory 200 is a strobe device, the in-camera control includes photometric control for accumulating and acquiring light emitted by the strobe device using the image sensor 122, control for calculating an indicated value of a light emission amount of the strobe device, and the like. When the in-camera control is thus completed in the step S509, the flow returns to the step S504 and the camera control circuit B 102 again detects whether or not the event has occurred.

As described above, the camera 100 can control the attached accessory 200 in accordance with the flowcharts of FIGS. 9 and 10.

Figure 11:
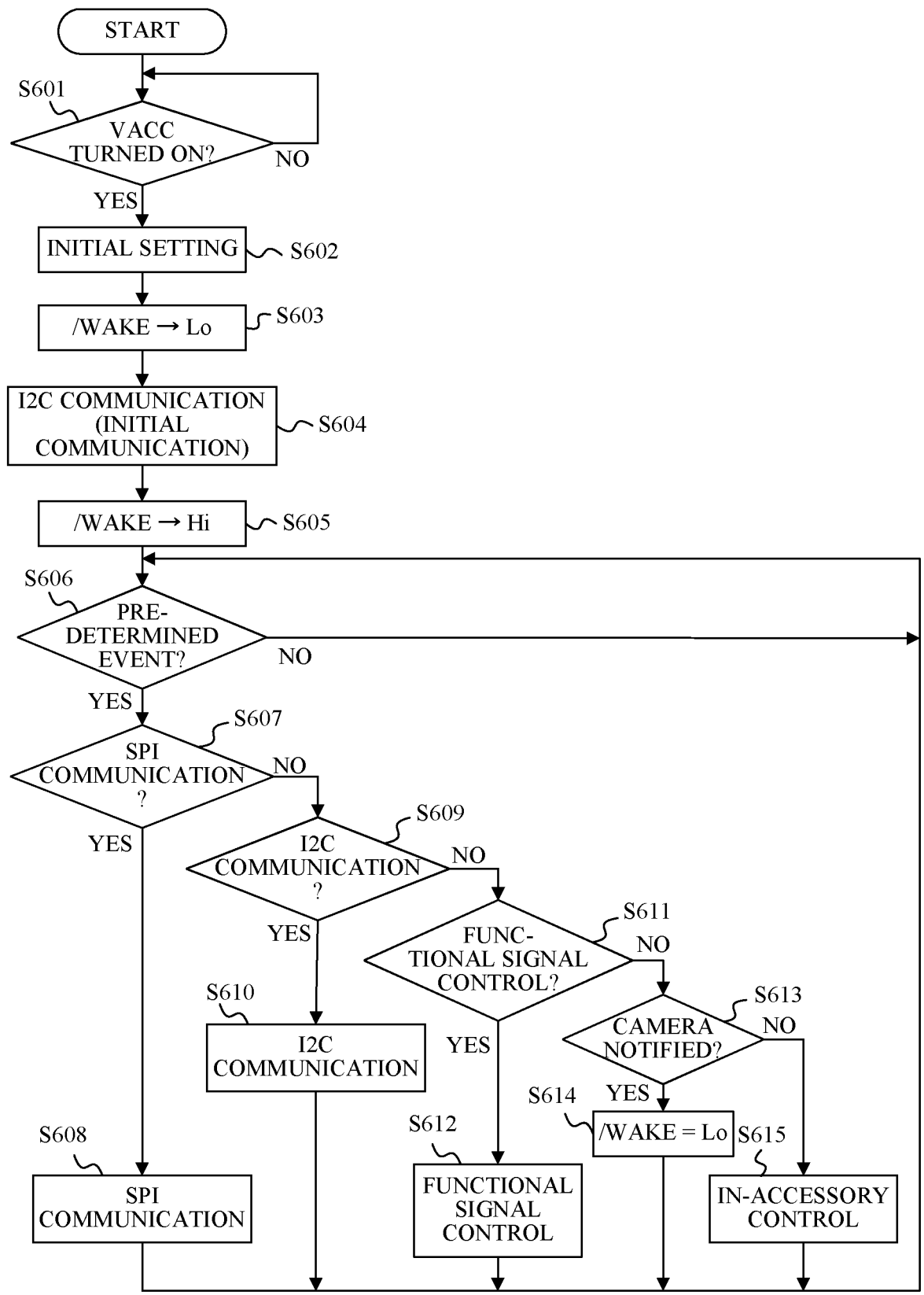
FIG. 11 is a flowchart showing the operation of the accessory control circuit in this embodiment.

FIG. 11 is a flowchart illustrating an operation of the accessory control circuit 201, and illustrates processing of the accessory control circuit 201 from when the accessory 200 is attached to the camera 100 to when the functions of the accessory 200 are operated.

In the step S601, the accessory control circuit 201 waits for the accessory power supply VACC from the camera 100 to be turned on. In the case where the accessory 200 has no battery 205, turning on of the accessory power supply VACC is detectable when power is supplied to the accessory control circuit 201 and the operation of the accessory control circuit 201 itself is started. In the case where the accessory 200 has the battery 205, the accessory control circuit 201 can detect that the accessory power supply VACC is turned on even when the accessory control circuit 201 monitor the voltage value of the accessory power supply VACC in addition to the above functions. In the case where the accessory power supply VACC is turned on, the flow proceeds to the step S602.

In the step S602, the accessory control circuit 201 makes a predetermined initial setting. For example, the accessory control circuit 201 sets an operating frequency of the microcomputer, an input/output control port of the microcomputer, initialization of a timer function of the microcomputer, and initialization of an interrupt function of the microcomputer. When the initial setting in the step S602 is completed, the flow proceeds to the step S603. In the step S603, the accessory control circuit 201 performs control for changing the communication request signal /WAKE to a low output and the camera 100 is notified that the initial setting is completed.

Next, in the step S604, the accessory control circuit 201 responds to the I2C communication from the camera 100 and transmits 15-byte accessory information. The accessory information includes various information illustrated in FIG. 4, as described above. When the initial communication of S604 is completed, the flow proceeds to the step S605. In the step S605, the accessory control circuit 201 performs control for changing the communication request signal /WAKE to a high level. When the initial communication is completed, the flow proceeds to step S606. In the step S606, the accessory control circuit 201 determines (detects) whether or not a predetermined event has occurred. If no event has occurred, the flow returns to the step S606 and the accessory control circuit 201 again determines (detects) whether or not the event has occurred, and if the event has occurred, the flow proceeds to the step S607.

In the step S607, the accessory control circuit 201 determines whether or not the event determined in the step S606 is an event that requires the SPI communication with the camera 100. The flow proceeds to the step S608 if the detected event is the event that requires the SPI communication, and the flow proceeds to the step S609 if the detected event is not the event that requires the SPI communication.

In the step S609, the accessory control circuit 201 determines whether or not the event determined in the step S606 is an event that requires I2C communication with the camera 100. The flow proceeds to the step S610 if the detected event is the event that requires the I2C communication, and the flow proceeds to the step S611 if the detected event is not the event that requires the I2C communication.

In the step S611, the accessory control circuit 201 determines whether or not the event detected in the step S606 is an event that requires control using a functional signal. The flow proceeds to the step S612 if the detected event is the event that requires the control using the functional signal, and the flow proceeds to the step S613 if the detected event is not the event that requires the control using the functional signal.

In the step S613, the accessory control circuit 201 determines whether or not the event detected in the step S606 is an event that notifies the camera 100 by the communication request signal /WAKE. The flow proceeds to the step S614 if the detected event is the event that notifies the camera 100 by the communication request signal /WAKE, and the flow proceeds to the step S615 if the detected event is not the event that notifies the camera 100 by the communication request signal /WAKE.

In the step S608, the accessory control circuit 201 performs the SPI communication with the camera 100. In the case where the communication request signal /WAKE is at a low output state when the accessory control circuit 201 executes the SPI communication, the accessory control circuit 201 performs control for changing the communication request signal /WAKE to a high output state after the SPI communication. The SPI communication includes, for example, communication of an instruction to turn on a microphone operation from the camera 100, communication of an instruction to turn off the microphone operation, and communication of an instruction to switch a sound collection directivity of the microphone, in the case where the accessory 200 is a microphone device. The SPI communication further includes communication of an instruction to switch an equalizer function of the microphone. In the case where the accessory 200 is a strobe device, the SPI communication includes communication for reading out setting information on the strobe device, communication for notifying the strobe device of the setting information, and the like. When the predetermined SPI communication in the step S608 is completed, the flow returns to the step S606 and the accessory control circuit 201 again detects whether or not the event has occurred.

In the step S610, the accessory control circuit 201 performs the I2C communication with the camera 100. In the case where the communication request signal /WAKE is at a low output state when the SPI communication is executed, control for changing the communication request signal /WAKE into a high output state is performed after the I2C communication. The I2C communication executed in the step S610 includes, for example, communication for reading out a communication request factor for the signal notification of the communication request signal /WAKE of which the accessory control circuit 201 has notified the camera 100. When the predetermined I2C communication in the step S610 is completed, the flow returns to the step S606 and the accessory control circuit 201 again detects whether or not the event has occurred.

In the step S612, the accessory control circuit 201 controls the camera 100 using a functional signal. The control includes, for example, reception control of the audio data clock signal BCLK of FNC1 and the audio data channel signal LRCLK of FNC2 output from the camera 100, in the case where the accessory 200 is a microphone device, and output control of the voice data signal SDAT of FNC3 in synchronization with these signals. In the case where the accessory 200 is a strobe device, the control includes reception control of the strobe emission synchronization signal XOUT of FNC4 for strobe emission control. When the control using the functional signal in the step S612 is completed, the flow returns to the step S606 and the accessory control circuit 201 again detects whether or not the event has occurred.

In the step S614, the accessory control circuit 201 stores a communication request factor number to the camera 100 in response to the event determined in the step S606 in an unillustrated volatile memory of the accessory 200, and performs control for changing the communication request signal /WAKE to a low output. The communication request factor number is a unique number assigned to each factor content as explained with reference to FIG. 7. When the low output control of the communication request signal /WAKE in the step S614 is completed, the flow returns to the step S606 and the accessory control circuit 201 again determines whether the event has occurred.

In the step S615, the accessory control circuit 201 performs in-accessory control according to the event determined in the step S606. The in-accessory control executed in the step S615 includes, for example, detecting control of a remaining battery level, detecting control of an operation of the operation switch 212, and the like, in the case where the accessory 200 includes the battery 205. When the in-accessory control in the step S615 is completed, the flow returns to the step S606 and the accessory control circuit 201 again detects whether the event has occurred.

In accordance with the flowchart of FIG. 11, the accessory 200 can perform functional operations after the accessory 200 is attached to the camera 100.

Referring now to FIGS. 9 to 11, a description will be given of processing of the camera 100 and the accessory 200 to determine the SPI communication method. A description of the already explained contents will be omitted.

In the step S406 of FIG. 9, the camera control circuit A101 performs I2C communication with the accessory 200, and reads out the accessory information illustrated in FIG. 4 regarding the SPI communication. As described above, all 15-byte accessory information may be read out. Alternatively, part of the accessory information in FIG. 4 including the D1 data at the address 0x0C, the D0 data at the address 0x0C, and the D7-D0 data at the address 0x0D may be read out of the accessory information which is the information on the SPI communication.

In step S410, the camera control circuit A101 notifies the camera control circuit B102 of the information on the SPI communication read in the step S406. The information to be notified may include information other than the read accessory information.

In the step S501 of FIG. 10, the camera control circuit B102 acquires the information on the SPI communication from the camera control circuit A101 by the I2C communication. As described above, the acquired information may include information other than the information on the SPI communication.

In the step S503, the camera control circuit B102 sets the SCLK signal, the CS signal, the MOSI signal, and the MISO signal for performing the SPI communication. Regarding the CS signal, the initial state of the signal is set based on the D0 data at the address 0x0C among the accessory information acquired in the step S501. If the D0 data at the address 0x0C in the accessory information is 0, the initial state of the CS signal is set to a high level. If the D0 data at the address 0x0C in the accessory information is 1, the initial state of the CS signal is set to a low level.

In the step S506, the camera control circuit B102 performs the SPI communication control based on the D1 data at address 0x0C among the accessory information acquired in the step S501 and the D7-D0 data at address 0x0D among the accessory information. If the D1 data at the address 0x0C is 0 among the accessory information, the camera control circuit B102 determines that the accessory 200 supports the SPI protocol A, and performs the SPI communication in accordance with the flowchart of FIG. 2C described above.

In step S103 of FIG. 2C, the camera control circuit B102 performs wait processing for predetermined time T_CS. The predetermined time T_CS is a predetermined value, and this embodiment performs the wait processing for 50 µs. In the step S108 of FIG. 2C, the camera control circuit B102 performs time weight processing for the communication interval corresponding to the D7-D0 data at the address 0x0D among the accessory information illustrated in FIG. 8A as the predetermined time T_INTERVAL. This embodiment performs the weight processing for 100 µs, when the D7-D0 data at the address 0x0D in the accessory information is 7.

Thus, in the case where the D1 data at the address 0x0C is 0 among the accessory information, the information on the communication interval (wait processing time) in the SPI communication is uniquely set based on the D7-D0 data at the address 0x0D among the accessory information acquired by the I2C communication. This configuration enables communication suitable for the SPI communication function of the accessory 200.

This embodiment illustrates an example in which the D7 data at the address 0x05 among the accessory information is 0, that is, the accessory 200 is not in the firmware update mode state. On the other hand, in the case where the D7 data at the address 0x05 among the accessory information is 1, the following operation is performed. That is, as the predetermined time T_INTERVAL in the step S108 of FIG. 2C, the time weight processing for the communication interval corresponding to the D7-D0 data at the address 0x0E among the accessory information illustrated in FIG. 8B is performed. For example, in the case where the D7-D0 data at the address 0x0E among the accessory information is 7, the wait processing for 100 ms is performed.

Generally, a program operation of a nonvolatile memory such as a flash microcomputer is required in the firmware update operation. Since the processing time required for the program operation may be longer than that of the accessory function processing, acquiring the accessory information for the firmware update mode state enables SPI communication suitable for the firmware update operation.

When the D1 data at the address 0x0C among the accessory information is 1, the camera control circuit B102 determines that the accessory 200 corresponds to the SPI protocol B, and performs the SPI communication in accordance with the flowchart of FIG. 2E described above. Thus, in the case where the D1 data at the address 0x0C among the accessory information is 1, it is confirmed by the potential of the MISO signal whether the accessory 200 is in the SPI communicable state. This configuration enables communication suitable for the accessory in which the communication interval (wait processing time) in the SPI communication is not uniquely determined. As described above, acquiring the accessory information on the SPI communication function of the accessory 200 by the I2C communication and performing control based on the accessory information enable communication suitable for the SPI communication function of the accessory.

In the step S602 of FIG. 11, the accessory control circuit 201 makes a predetermined initial setting, and sets an SCLK signal, a CS signal, a MOSI signal, and a MISO signal for SPI communication. For the CS signal, a communication request interrupt is set based on the D0 data at the address 0x0C among the accessory information. In the case where the D0 data at the address 0x0C in the accessory information is 0, a setting is made such that a low edge of the CS signal can be interrupted and detected. In the case where the D0 data at the address 0x0C in the accessory information is 1, a setting is made such that a high edge of the CS signal can be interrupted and detected.

In the step S604, the accessory control circuit 201 responds to the I2C communication from the camera 100 and transmits the accessory information. In the step S608, the accessory control circuit 201 performs SPI communication control based on the D1 data at the address 0x0C among the accessory information and the D7-D0 data at address 0x0D among the accessory information notified to the camera 100 in the step S604. In the case where the accessory control circuit 201 supports the SPI protocol A, the D1 data at the address 0x0C in the accessory information is 0, so the SPI communication is performed in accordance with the flowchart of FIG. 2D described above. Thus, in the case where the D1 data at the address 0x0C in the accessory information is 0, communication is performed at the communication interval (wait processing time) according to the D7-D0 data at the address 0x0D in the accessory information notified to the camera 100 by the I2C communication in the step S604. Therefore, communication suitable for the SPI communication function of the accessory 200 becomes available. In the case where the accessory control circuit 201 supports the SPI protocol B, the D1 data at the address 0x0C in the accessory information is 1, so SPI communication is performed according to the flowchart of FIG. 2F described above.

As described above, in the step S212, the accessory control circuit 201 confirms whether the SPI communication is available, and changes the level of the MISO signal according to the confirmation result (steps S213 and S214). For example, when the accessory 200 is a strobe device, it is necessary not to accept communication with the camera 100 during the light emission control in order to control the light emission timing with an accuracy of several us order. In such a case, the accessory control circuit 201 performs control for changing the MISO signal to a low level, so that the camera 100 can wait for communication, and can receive the following command by performing control for changing the MISO signal to a high level after the light emission control is completed. Thus, control with the SPI protocol B may be performed in the accessory or the like that needs to control the operation timing of the accessory 200 with accuracy on the order of several microseconds.

In this embodiment, an example is illustrated in which the D7 data at the address 0x05 in the accessory information is 0, that is, the accessory 200 is not in the firmware update mode state. On the other hand, in the case where the D7 data at the address 0x05 in the accessory information is 1, the camera 100 performs time weight processing for the communication interval corresponding to the D7-D0 data at the address 0x0E among the accessory information illustrated in FIG. 8B and performs SPI communication with the accessory 200. For example, in the case where the D7-D0 data at the address 0x0E in the accessory information is 7, the camera 100 is notified of the wait processing for 100 ms.

Generally, a program operation in a nonvolatile memory such as a flash microcomputer is required in the firmware update operation. Since the processing time required for the program operation may be longer than that of the accessory function processing, acquiring the accessory information for the firmware update mode state enables SPI communication suitable for the firmware update operation.

Figure 12A:
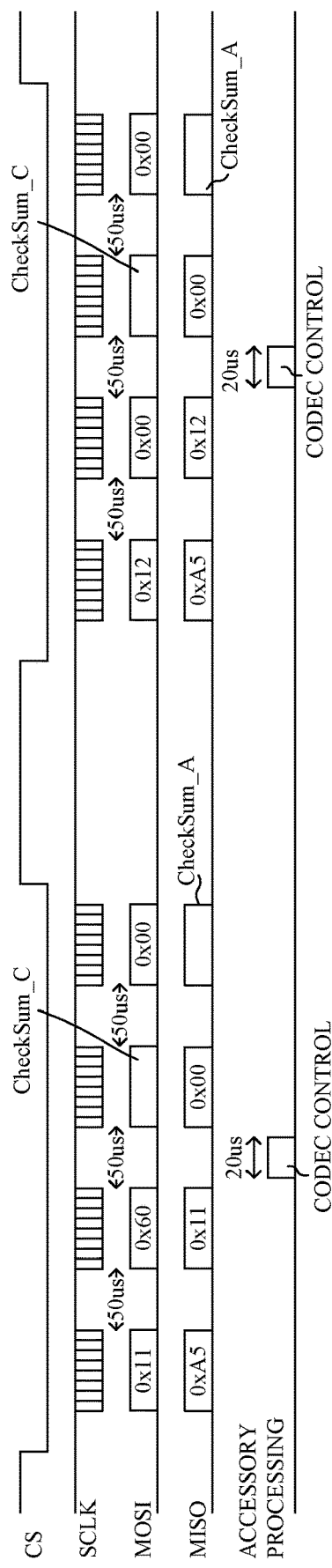
FIGS. 12A and 12B illustrate a relationship between a communication content in the SPI communication and an operation of an accessory in this embodiment.
Figure 12B:
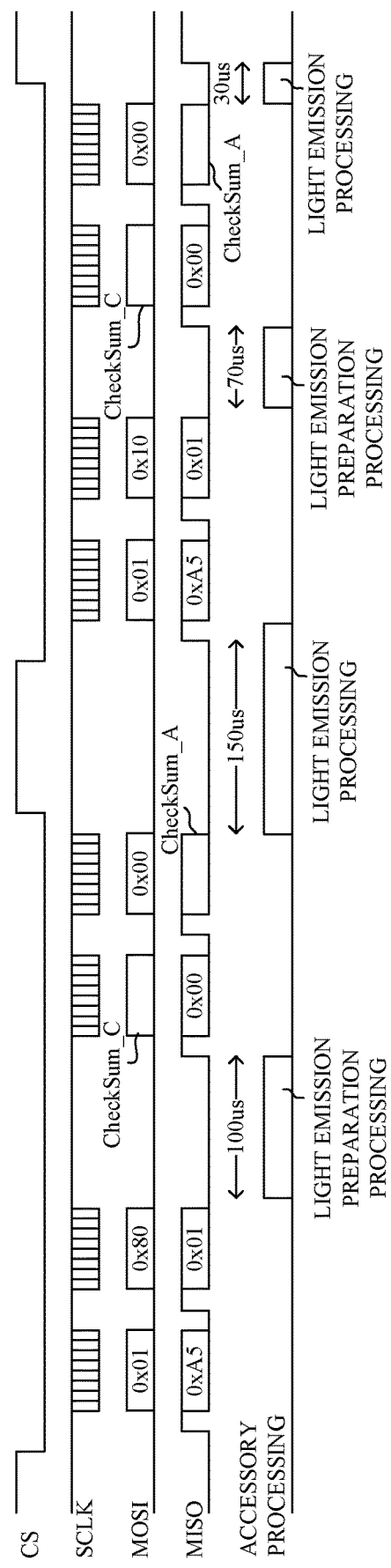

FIG. 12A illustrates an example of a relationship between the communication content and the operation of the accessory 200 in the SPI protocol A, and FIG. 12B illustrates an example of a relationship between the communication content and the operation of the accessory 200 in the SPI protocol B. FIG. 12A is an example in which the camera 100 notifies the accessory 200 of the command 0x11 and the command 0x12, respectively. In this embodiment, the accessory 200 is a microphone device. These figures illustrate examples of communications with a communication interval of 50 μs (D7-D0 data of 0x0D is 6).

A command 0x11 is a command indicating a volume change instruction, and a second-byte MOSI data means a volume value. In the example of FIG. 12A, 0x60 is specified as the volume value. The accessory control circuit 201 that has received the volume change instruction controls codec. This embodiment assumes that the time required for controlling the codec is 20 μs.

A command 0x12 is a command for instructing turning on and off of a voice data output, and when the second-byte MOSI data is 0, it means that the voice data output is turned off, and when the MOSI data is 1, it means that the voice data output is turned on. In the example of FIG. 12A, the instruction of turning off the audio data output is issued. The accessory control circuit 201 that has received the instruction of turning off the audio data output controls the codec. The time required to control the codec is 20 μs as in the command 0x11.

In general, the accessory control circuit 201 for realizing the SPI protocol A can be made at a lower cost than the accessory control circuit 201 for realizing the SPI protocol B, so that control with the SPI protocol A may be used for an accessory having a small difference in processing time in response to an instruction from the camera 100.

FIG. 12B illustrates an example in which the command 0x01 is issued twice from the camera 100 to the accessory 200. In this embodiment, the accessory 200 is a strobe device.

The command 0x01 is a command indicating a light emission instruction, and the second-byte MOSI data means a light emission amount. In the example of FIG. 12B, the first command instructs 0x80 as the light emission amount, and the second command instructs 0x10 as the light emission amount. The accessory control circuit 201 that has received the light emission instruction prepares for light emission. The time required to prepare for the light emission depends on the light emission amount, and it is assumed that 100 μs is required when the light emission amount is 0x80 and 70 μs is required when the light emission amount is 0x10. The accessory control circuit 201 performs control for changing MISO to a low level until the light emission preparation is completed, and notifies the camera control circuit B102 that SPI communication is unavailable. When the light emission preparation is completed, the accessory control circuit 201 performs control for changing MISO to a Hi level and notifies the camera control circuit B102 that the SPI communication is available.

When the fourth-byte transfer is completed, the accessory control circuit 201 performs light emission processing. The time required for the light emission processing depends on the light emission amount, and it is assumed that 150 μs is required when the light emission amount is 0x80 and 30 μs is required when the light emission amount is 0x10. The accessory control circuit 201 performs control for changing MISO to a low level until the light emission processing is completed, and notifies the camera control circuit B102 that SPI communication is unavailable. When the light emission processing is completed, the accessory control circuit 201 performs control for changing MISO to a high level and notifies the camera control circuit B102 that the SPI communication is available.

Thus, if the accessory whose command processing time fluctuates is controlled with the SPI protocol A, it is necessary to set the communication interval to the longest processing time and thus the control becomes redundant. Therefore, the accessory in which the time required for command processing fluctuates may be controlled with the SPI protocol B.

As described above, the communication suitable for the SPI communication function of the accessory can be controlled by notifying the accessory information on the SPI communication function of the accessory 200 by I2C communication and by performing the SPI communication control based on the accessory information.

As described above, in this embodiment, the image pickup apparatus (camera 100) is attachable to and detachable from the accessory 200, and includes the first control unit (camera control circuit A101) and the second control unit (camera control circuit B102). The first control unit can communicate with the accessory by the first communication method, and the second control unit can communicate with the accessory by the second communication method. The first control unit acquires control information on the second communication method from the accessory. The second control unit determines a control method of communication with the accessory based on the control information acquired by the first control unit. The first control unit and the second control unit may be configured as one integrated control unit.

In this embodiment, the accessory 200 is attachable to and detachable from the image pickup apparatus (camera 100), and includes the control unit (accessory control circuit 201) communicable with the image pickup apparatus by the first communication method and the second communication method. The control unit transmits control information on the second communication method to the image pickup apparatus by the first communication method, and communicates with the image pickup apparatus by the second communication method according to the control method determined by the image pickup apparatus based on the control information.

The second communication method may provide communication at a higher communication speed than that of the first communication method. The first communication method may be an I2C communication method including two signals, i.e., a clock signal (SCL) and a data signal (SDA). The second communication method may be an SPI communication method including a clock signal (SCLK), a chip select (CS) signal, a master output signal (MOSI), and a master input signal (MISO).

The control method determined based on the control information may include the first control method that provides communication without confirming a communicability state of the accessory, and the second control method that provides communication after confirming the communicability state of the accessory. The second control unit may communicate with the accessory by the first control method or the second control method determined based on the control information. The second control method may be a control method for determining whether the accessory is in a communicable state by the second communication method, based on a level (potential level) of a master input signal.

The control information may include information indicating a transmission interval of the communication data by the first control method. The control information may include information indicating the mode (operating mode) of the accessory.

In each of the above embodiments, the accessory 200 is directly attached to the camera 100, but another implementation may be used. For example, the camera 100 and a main accessory corresponding to the accessory 200 may communicate with each other via an intermediate accessory such as an adapter device attached to the camera 100 and the main accessory. In this implementation, the intermediate accessory may execute communication control similar to at least part of the communication control executed by the accessory 200 and the communication control executed by the camera 100, which are described in the above embodiments. The intermediate accessory may serve as an information transmission path such that the accessory outputs to the main accessory information corresponding to information input from the camera 100 and the main accessory outputs information corresponding to the input information to the camera 100. Thus, the accessory according to the present invention includes various accessories such as a microphone device, an illumination device, and an adapter device. Further, the adapter device can also be included in the electronic apparatus.

Each of the above embodiments can provide an electronic apparatus, a control method of the electronic apparatus, an accessory, and a control method of the accessory, each of which can enhance the responsiveness at a start in a system in which the accessory is attached to the electronic apparatus.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2021-072962, filed on Apr. 23, 2021, which is hereby incorporated by reference herein in its entirety.

What is claimed is:
1. An image pickup apparatus attachable to and detachable from an accessory, the image pickup apparatus comprising:
at least one processor; and
at least one memory coupled to the at least one processor storing instructions that, when executed by the at least one processor, cause the at least one processor to function as:
a first control unit communicable with the accessory by a first communication method; and
a second control unit communicable with the accessory by a second communication method, wherein the first control unit acquires control information on the second communication method from the accessory, and wherein the second control unit determines a control method for communication with the accessory based on the control information acquired by the first control unit, wherein the control method includes:
- a first control method for performing communication without checking whether or not the accessory is communicable; and
- a second control method for performing communication after checking whether or not the accessory is communicable, and wherein the second control unit communicates with the accessory by the first control method or the second control method that has been determined based on the control information, wherein the second control method is a control method for determining information on whether or not the accessory is communicable by the second communication method, based on a level of the master input signal, and wherein the control information includes information indicating a transmission interval between communication data in the first control method.

2. The image pickup apparatus according to claim 1, wherein the second communication method has a communication speed higher than that of the first communication method.

3. The image pickup apparatus according to claim 1, wherein the first communication method is an I2C communication method that consists of a clock signal and a data signal.

4. The image pickup apparatus according to claim 1, wherein the second communication method is an SPI communication method that consists of a clock signal, a chip select signal, a master output signal, and a master input signal.

5. The image pickup apparatus according to claim 1, wherein the control information includes information indicating a mode of the accessory.

6. An accessory attachable to and detachable from an image pickup apparatus, the accessory comprising:
at least one processor; and
at least one memory coupled to the at least one processor storing instructions that, when executed by the at least one processor, cause the at least one processor to function as a control unit communicable with the image pickup apparatus by a first communication method and a second communication method, wherein the control unit
transmits control information on the second communication method to the image pickup apparatus in the first communication method, and
communicates with the image pickup apparatus by the second communication method according to a control method that has been determined by the image pickup apparatus based on the control information, wherein the control method includes:
- a first control method for performing communication without checking whether or not the accessory is communicable; and
- a second control method for performing communication after checking whether or not the accessory is communicable, and wherein the control unit communicates with the image pickup apparatus by the first control method or the second control method that has been determined based on the control information, wherein the second control method is a control method for determining information on whether or not the accessory is communicable by the second communication method, based on a level of the master input signal, and wherein the control information includes information indicating a transmission interval between communication data in the first control method.

7. The accessory according to claim 6, wherein the second communication method has a communication speed higher than that of the first communication method.

8. The accessory according to claim 6, wherein the first communication method is an I2C communication method that consists of a clock signal and a data signal.

9. The accessory according to claim 6, wherein the second communication method is an SPI communication method that consists of a clock signal, a chip select signal, a master output signal, and a master input signal.

10. The accessory according to claim 6, wherein the control information includes information indicating a mode of the accessory.

11. A control method of an image pickup apparatus attachable to and detachable from an accessory, the control method comprising the steps of:
acquiring, by a first communication method, control information on a second communication method from the accessory;
determining, based on the control information, a control method of communication with the accessory by the second communication method; and
communicating with the accessory by the second communication method according to the control method of the communication with the accessory, wherein the control method includes:
- a first control method for performing communication without checking whether or not the accessory is communicable; and
- a second control method for performing communication after checking whether or not the accessory is communicable, and wherein the second control unit communicates with the accessory by the first control method or the second control method that has been determined based on the control information, wherein the second control method is a control method for determining information on whether or not the accessory is communicable by the second communication method, based on a level of the master input signal, and wherein the control information includes information indicating a transmission interval between communication data in the first control method.

12. A non-transitory computer-readable storage medium storing a program for causing a computer of an image pickup apparatus to execute a control method according to claim 11.

13. A control method of an accessory attachable to and detachable from an image pickup apparatus, the control method comprising the steps of:
transmitting, by a first communication method, control information on a second communication method to the image pickup apparatus; and
communicating with the image pickup apparatus by the second communication method according to a control method that has been determined by the image pickup apparatus based on the control information, wherein the control method includes:
- a first control method for performing communication without checking whether or not the accessory is communicable; and
- a second control method for performing communication after checking whether or not the accessory is communicable, and
- wherein the control unit communicates with the image pickup apparatus by the first control method or the second control method that has been determined based on the control information, wherein the second control method is a control method for determining information on whether or not the accessory is communicable by the second communication method, based on a level of the master input signal, and wherein the control information includes information indicating a transmission interval between communication data in the first control method.

14. A non-transitory computer-readable storage medium storing a program for causing a computer of an accessory to execute a control method according to claim 13.

* * * * *